United States Patent [19]
Shaw

[11] Patent Number: 6,101,479
[45] Date of Patent: *Aug. 8, 2000

[54] SYSTEM AND METHOD FOR ALLOCATING COMPANY RESOURCES TO FULFILL CUSTOMER EXPECTATIONS

[76] Inventor: James G. Shaw, 10655 Clubhouse, Cupertino, Calif. 95014

[ * ] Notice: This patent issued on a continued prosecution application filed under 37 CFR 1.53(d), and is subject to the twenty year patent term provisions of 35 U.S.C. 154(a)(2).

[21] Appl. No.: 08/548,333

[22] Filed: Nov. 1, 1995

Related U.S. Application Data

[63] Continuation-in-part of application No. 08/391,625, Feb. 21, 1995, which is a continuation of application No. 08/275,643, Jul. 15, 1994, which is a continuation of application No. 07/914,300, Jul. 15, 1992.

[51] Int. Cl.$^7$ ................................................ G06F 17/60
[52] U.S. Cl. .................................................. 705/8
[58] Field of Search ............................ 395/208; 705/8, 705/7, 9–11

[56] References Cited

U.S. PATENT DOCUMENTS 5,467,471  11/1995  Bader ............................... 395/600

OTHER PUBLICATIONS

M. Hardaker & B.K. Ward, "Getting Things Done (How to make a team work)," *Harvard*, Business Review Nov.–Dec. 1987, vol. 65, No. 6 (Reprint No. 87607), pp. 1–8.

Chapter 4 entitled "Process Design," *Quality Process Management*, by Gabriel A. Pall, Copyright 1987 by Prentice Hall, pp. v–ix, and 146–169.

Chapter 2 entitled "Setting the Stage for Business Process Improvement," *Business Process Improvement*, Dr. H.J. Harrington, Copyright 1991 by McGraw–Hill, Inc., pp. iii–vii, front & back cover flaps, and pp. 34–43.

AT&T, "Process Quality Management & Improvement Guidelines, (Step 2)," AT&T Quality Steering Committee, Issue 1.1, Copyright 1987, 1988 AT&T, pp. ix, 5, 18, & 23–28.

AT&T, "PQMI: Tips, Experiences, & Lessons Learned (Chapter 3)," AT&T Quality Steering Committee, Copyright 1990 AT&T, pp. ix–xi, 19–22.

(List continued on next page.)

*Primary Examiner*—Frantzy Poinvil
*Attorney, Agent, or Firm*—Limbach & Limbach L.L.P.

[57] ABSTRACT

An apparatus and method for allocating the resources of an organization. The method includes the steps of acquiring the information required to construct a model of the organization's primary processes as viewed from the perspective of a customer. This information includes customer specific information such as customer inputs to the organization, customer outputs from the organization, and performance measures used by a customer to assess the quality of the outputs of the organization. Organization specific information such as the functional departments or units of the organization, and the inputs and outputs of each unit is also acquired. A model of the organization identifying the primary macro processes which a customer perceives to occur within the organization when that organization responds to a customer initiated input by producing a desired output is then constructed. The model is developed and enhanced to show the interrelationships between the primary macro processes, and the relevant front office, back office, and support subprocesses of the organization. The organization's resources are then allocated to the process whose improvement will have the greatest effect on customer-based performance measures of the organization.

40 Claims, 16 Drawing Sheets

OTHER PUBLICATIONS

R.F. Boedecker, "Eleven Conditions for Excellence: The IBM Total Quality Improvement Process," *American Institute of Management*, Copyright 1989, pp. v, 295–299, 303, 327, 341, & worksheet.

AT&T, *Process Quality Management & Improvement Guidelines*, AT&T Quality Steering Committee, Issue 1.1, Copyright 1987, 1988 AT&T, entire copy.

AT&S, *PQMI: Tips, Experiences, & Lessons Learned*, published by AT&T Steering Committee, Copyright 1990 AT&T, entire copy.

Joshua Hammond, "An International Look at Quality Practices", Management Review, v 80, n, pp. 38–41, May 1991.

"PQMI: Tips, Experiences, & Lessons Learned", AT & T Quatlity Steering Commitee, 1990.

Ray Boedecker, "Eleven Conditions for Excellence: The IBM Total Quality Improvement Process", American Institute of Management, 1989.

Level 6: Unknown

Process status has not been determined. All processes are classified at this level until sufficient data has been collected to determine their true status.

Level 5: Defined

☐ Process ownership has been assigned.

☐ Team membership has been established.

☐ Support from middle managers has been solicited and pledged.

☐ All customers have been identified.

☐ Customer expectations, which include the process's outputs and the adjectives that describe them, are identified and documented.

☐ Feedback measurements that reflect the customer's view of the process are identified, quality measures are set, and systems to collect the data are established.

☐ Improvement objectives for the customer's three most important quality measures are defined and are being actively pursued.

☐ Inputs and their related requirements and quality measures are identified, and data is being collected.

☐ Process end point is agreed upon with all customers, and start point is agreed upon with all suppliers.

☐ A high-level flow chart from the *customer's point of view* is complete.

☐ Measurement charts of process performance are posted where they can be seen by staff members and are updated regularly.

☐ Control points are defined and measurement indicates the process is stable and meets the most important customer expectations.

☐ A review process is in place and scheduled to be held at least every six months, if not more frequently.

Level 4: Functional

FIG. 8A

☐ All requirements for Level 5 have been met.

☐ The overall process as it currently exists is flowcharted and documented from the customer's point of view.

☐ Data is being collected on process cycle time, cost per cycle, and other efficiency measurements.

☐ Substantial improvement activities aimed at streamlining the process are in progress.

☐ Overall operational requirements are met.

☐ Internal effectiveness objectives are fifty percent accomplished, and the results are posted.

☐ Customer expectations are being met.

☐ Challenge objectives important to customers are established and being pursued.

☐ Informal benchmarking has been started.

☐ Measurements of the four "cost of quality" factors are developed, "cost of quality" is computed, and trends are identified.

☐ Formal job procedures exist and training is underway.

☐ Improvement team understands and uses Statistical Process Control (SPC).

☐ Tracking and analysis of customer complaints have begun and results are posted.

Level 3: Proficient

☐ All requirements for Level 4 have been met.

☐ The cost of defects is being reduced.

☐ Cycle times, operational costs, and bureaucracy are being reduced.

☐ Most quality measurements show improvement.

☐ Crucial suppliers meet process requirements for inputs.

☐ The documentation of subprocesses is complete.

☐ Workers are being trained in team methods and problem-solving tools.

☐ All employees involved in the process know and understand the process overview.

☐ Customer expectations are benchmarked.

☐ Plans exist to formally benchmark the process.

☐ A proactive customer satisfaction measurement system is established that includes capturing 100% of all customer complaints.

☐ The customer reviews and agrees to process changes before they are implemented.

☐ Customer desires are identified and plans to meet them are set.

☐ Statistical Process Control (SPC) training needs have been identified, addressed, and implemented.

☐ All suppliers have committed to improving the quality of inputs to the process.

Level 2: Premier

☐ All requirements for Level 3 are met.

☐ Output schedules have been met without fail for at least six months or more.

☐ Customer expectations have been consistently met for the last six months or more.

☐ Customers attend process performance reviews.

☐ Customer expectations are updated regularly.

☐ Customer desires are being met.

☐ Ways to delight the customer are identified.

☐ Run control charts are used regularly.

☐ Feedback systems have been established close to the work they concern.

☐ The person doing the work also performs most of the related measurements.

☐ All measurements show improvement during the last six months.

☐ An independent audit plan has been developed and is being used.

☐ Documentation is updated regularly.

☐ All employees have been trained in Statistical Quality Control (SQC) as it applies to their job requirements, and they are scheduled for a refresher course.

☐ Employees evaluate the job skill training positively.

☐ The process has been formally benchmarked and objectives are set.

☐ Employees are empowered to provide customer help and are measured accordingly.

☐ Employees surveys substantiate that the process is easier to use.

☐ A philosophy exists that errors are unacceptable.

☐ Everyone works tirelessly to prevent errors.

Level 1: World-class

☐ All the requirements for Level 2 have been met.

☐ No customer has complained that expectations were not met during the last six months.

☐ Many customer desires are met.

☐ Customers are delighted by innovative products or services.

☐ All measurements exceed those of the benchmark for three consecutive months.

☐ The process is often benchmarked by others in the industry.

☐ All supplier inputs meet requirements.

☐ Employees are regularly surveyed to identify additional improvement possibilities and training needs. Their suggestions are acted upon.

☐ The process handles exceptions better than the benchmark process does. Exceptions are documented and tracked.

☐ World-class status is confirmed by an independent audit.

FIG. 8B

SYSTEM AND METHOD FOR ALLOCATING COMPANY RESOURCES TO FULFILL CUSTOMER EXPECTATIONS

RELATED APPLICATIONS

This application is a continuation-in-part application of U.S. patent application Ser. No. 08/391,625, filed Feb. 21, 1995, which is a continuation of U.S. patent application Ser. No. 08/275,643, filed Jul. 15, 1994, which is itself a continuation of U.S. patent application Ser. No. 07/914,300, filed Jul. 15, 1992.

TECHNICAL FIELD

The present invention is directed to means for allocating resources within an organization, and more specifically, to an apparatus and method for allocating resources so as to improve the quality of an organization as perceived by a customer of the organization. This is done for the purposes of facilitating improvements in product quality, customer satisfaction, market share, and the overall efficiency of the organization.

BACKGROUND OF THE INVENTION

An organization or business functions by performing a set of activities which enable it to operate and attempt to achieve specific goals. These activities, or processes, generally involve a number of steps and may be intended to provide services, manufacture and sell products, or implement particular policies. However, most organizations are unable to successfully allocate their resources so as to maximize the potential of the organization, whether this potential is expressed in terms of profits, customer satisfaction, business volume, or some other measure. One way to carry out this maximizing process would be to determine a set of quality or performance measures for the processes which occur within an organization, and then optimizing those measures. If the quality measures chosen can be correlated with the characteristics of the organization which are desired to be maximized, i.e., the profits, customer satisfaction, etc., then optimizing the quality measures would lead to an improvement in the operation of the organization. However, this approach is not followed by most organizations.

If an internal activity of an organization is expressed as a process which undergoes multiple cycles, then it is generally desired that the outcome of each cycle of the process be the same within specified limits. This is because the reproducibility of the process provides a degree of consistency with respect to the operation of the organization, and this consistency provides a base line for evaluating the organization and improving other features.

Improvements to the quality of a repetitive process are suggested when significant variation exists in the outcome of each cycle of the process. Hence, reducing the variation in the outcome of a process is one indication of an improvement in its overall quality. Determining the elements of a process, and the relationship between their respective inputs and outputs, assists in reducing the variation in the outcome of the process by identifying those aspects which can be modified to make the process more reproducible. This analysis of a process also assists in determining how best to allocate resources to improve the performance measures of the process and the organization as a whole.

Modern Quality Improvement (QI) techniques and methods were first developed during the 1920's by employees of Western Electric who were concerned with reducing the variation in the output of a manufacturing plant. In order to achieve this goal, techniques were developed which became known as Statistical Process Control (SPC). SPC is a tool for measuring the variation in the outcomes of repetitive processes. Employees measured the output of a process using SPC techniques, altered the steps of the process, and then repeated the output measurement. By adjusting the process parameters so as to reduce variation in the outcome, the quality of the process was improved.

SPC techniques can be extended and applied to all areas of an organization, from product design through manufacturing, and including sales and customer relations. The broad application of SPC techniques in this manner is termed Total Quality Control. Thus, using techniques such as SPC, efforts towards quality improvement have been extended to all phases of an organization's operation, and to all structures within the organization.

When quality improvement techniques are applied to an organization, both as a whole and to its constituent structures, substantial rewards can be obtained. These rewards include growth in market share, a reduction in costs, an improved image amongst consumers, and an increase in operational efficiency. The end result is a substantial competitive advantage.

Although the goal of improving an organization's quality or business potential is recognized as being important, efforts to achieve this goal have met with varying amounts of success. One of the reasons for a lack of success is that no systematic approach has been presented for initiating and maintaining a quality improvement effort within an organization. In most efforts to improve quality, only one set of processes (usually those related to manufacturing) is focused on, with the other processes only later receiving attention. This reduces the benefits which quality improvement efforts can provide when an organization is viewed as an entire system or process.

G. Pall in "Quality Process Management", published by Prentice-Hall (1987), H. Harrington in "BUSINESS PROCESS IMPROVEMENT: The Breakthrough Strategy for Total Quality, Productivity, and Competitiveness", published by McGraw-Hill, Inc. (1991), and R. F. Boedecker in "Eleven Conditions for Excellence: The IBM Total Quality Improvement Process", published by American Institute of Management (1991) discuss an example of a more restricted approach to quality improvement. The quality improvement efforts in these books are predicated on the assumption that managers have previously identified the macro processes within an organization. A macro process is a high-level process and one that may be composed of multiple sub-processes, but is not a sub-process of any other process, except for that of the organization when it is viewed as a single process. The approach described in the cited references concentrates on providing managers with techniques for improving quality within the previously identified processes and sub-processes. However, this does not provide a solution to the threshold problem, that of identifying the macro processes, and in particular, identifying those macro processes which impact the quality or performance measures which determine a customer's perception of the organization. These macro processes must be identified, and their function and effect on the organization understood, in order to efficiently allocate resources to those processes which will have the greatest impact on a customer's perception of the organization. If this impact is increased in a positive sense, then a customer will be more inclined to continue doing business with the organization. This will lead to an increase in sales volume, customer satisfaction, market share, and profits.

A similar view to that presented in the above references is discussed in "Getting things done: How to make a team work", by M. Hardaker and B. K. Ward, Harvard Business Review, vol. 65, No. 6, November–December 1987, p.112. The authors discuss how Process Quality Management techniques can be used to focus a team of employees on their collective mission within the organization. One stage of the technique involves listing the business activities or processes which the organization undertakes. However, as with the other references mentioned, no method is suggested for identifying those processes so that quality improvement efforts can be properly directed.

What is lacking is a method of providing the managers of an organization with the perspective needed to implement total quality control in a manner which has the greatest impact on a customer's perception of the organization. Such a perspective would include an understanding of all of the important processes which occur within the organization, along with the required inputs and outputs for each process. This would enable an organization's managers to understand how the processes are interrelated, and how limited resources may best be allocated to positively affect the functioning of the organization, by having the greatest impact on customer identified performance measures. After the macro processes have been identified, specific process improvement techniques can be applied to improve the quality of the processes and the organization as a whole.

Studies have shown that most organizations adopt a hit-or-miss method of determining how to allocate resources to improve customers' perceptions of the organization. Organizations that make incorrect decisions almost always do so because they utilize management's perspective as the framework for evaluating possible courses of action. This is particularly true for management decisions which relate to the allocation of organizational resources.

Thus, organizations need to be able to take the customer's perspective into account when making decisions, especially when allocating organizational resources. However, to do so requires a reorientation of management's perspective of the organization's activities (the organization's processes). An organization can be more successful by using its limited resources to systematically improve those activities that will produce the greatest benefit from the customers' point of view, where these benefits are typically evaluated by the customer in terms of performance or quality measures. This will result in an improvement in the customer-perceived quality of the organization, and will enable the organization to reap the benefits (increased market share, profits, etc.) which flow from the quality improvement.

However, the study of successful organizations (e.g., via selection of finalists and winners of the Malcolm Baldrige National Quality Award) has led to the realization that organizations cannot easily define quality as it is perceived by customers. The successful organization can only discover how its customers define and measure quality. Successful organizations are those which identify, define, and manage (allocate resources to) their processes according to the customer's perspective of what is important, not management's perspective. The organizations who err do so because the organization's management assumes it knows what is important to its customers. Consequently, they frequently focus on measurements of activities that have minimal impact upon the customer's positive perceptions of the organization.

What is desired is an apparatus and method for allocating an organization's resources so as to optimize the impact of those resources on the quality of the organization as it is viewed from a customer's perspective. This will improve those aspects of the organization (e.g., profits, sales volume, etc.) which are correlated with customer measures of the performance or quality of the organization.

SUMMARY OF THE INVENTION

The present invention is directed to an apparatus and method for allocating the resources of an organization in order to optimize the effects of that allocation on the quality of the organization, where the quality is expressed in terms of customer perceived performance measures.

The method includes the steps of determining and acquiring the information used to construct a model of the organization's primary processes as viewed from the perspective of a customer. This information includes customer related information such as customer inputs to the organization, customer outputs from the organization, and a set of performance measures which reflect the customer's assessment of the quality of the organization. Organization related information, such as the functional departments or units of the organization, and the inputs and outputs of each unit, is also identified and collected.

Next, a process based model of the organization is constructed. The model identifies the primary macro processes which a customer perceives to occur within the organization when that organization responds to a customer initiated input by producing a desired output. The model is developed and enhanced to show the interrelationships between the primary macro processes, and the relevant front office, back office, and support sub-processes of the organization. In one embodiment, the organizational model takes the form of a network having nodes (processes) and interconnections which represent the flow of inputs and outputs through the nodes.

The set of customer perceived performance or quality measures is correlated with the operation of the macro processes of the organization which impact those measures. This is followed by determining the node or process having the greatest impact on the quality of the organization as that quality is determined by a specified customer perceived quality measure. Once this has been done, the organization's resources are allocated to that node or process. Resources are then allocated to other nodes, eventually producing improvements in the customer perceived quality of the organization.

The method of the present invention may be implemented in the form of a storage medium in which is stored a database or group of databases containing the relevant information (customer, organization, and available resource data) used to construct the organizational model. The storage medium is accessed by a process data processor to construct the process based model of the organization. The model is then accessed by a process improvement processor which prioritizes the processes and determines how best to allocate the available resources to the organization's processes so as to have the greatest impact on a customer's perceptions of the quality of the organization.

Further objects and advantages of the present invention will become apparent from the following detailed description and accompanying drawings.

BRIEF DESCRIPTION OF THE DRAWINGS

FIGS. 8-A and 8-B show a process qualification checklist which can be used in determining the qualification level of the processes of the organization.

DETAILED DESCRIPTION OF THE INVENTION

Figure 1:
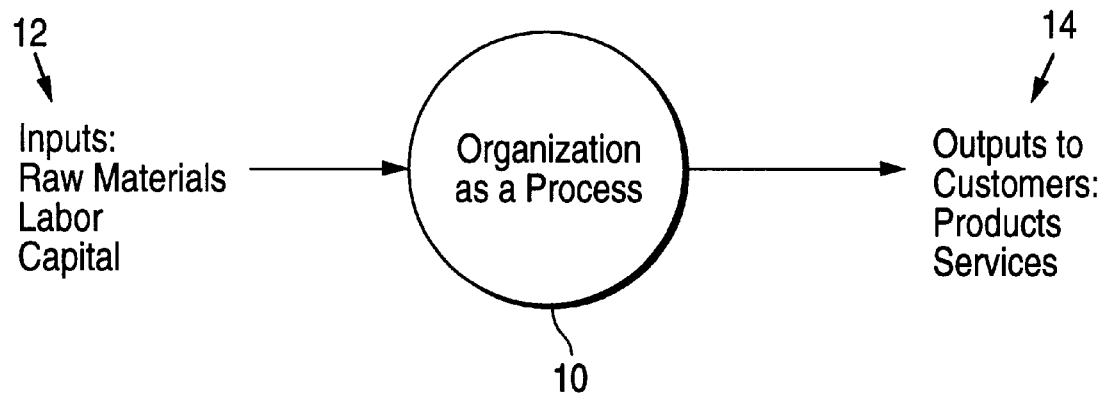
FIG. 1 shows an organization and its associated inputs and outputs, viewed as a linear transformation process.

The failure of most organizations to incorporate the customer's perspective into their efforts to improve the organization is rooted in how an organization is conceptualized. Historically, when dealing with resources, management's approach has been to conceptualize the organization as a linear process receiving inputs from suppliers (e.g., raw materials, labor, and capital) and transforming them (adding value) in such a way as to produce finished goods and/or services which are delivered to customers. This perspective has kept the organization focused on conservation of resources and maximization of profits, and can be graphically illustrated as shown in FIG. 1. FIG. 1 shows an organization 10 and its associated inputs 12 and outputs 14, viewed as a linear transformation process.

The approach depicted in FIG. 1 tends to lead to organizations that are supplier and resource constrained, instead of being customer-driven. Management in these organizations focuses on maximizing the efficient use of suppliers and other resources, where that efficiency is determined by measuring some aspect (profit margin, sales volume, etc.) of the manufacturing process or provision of services. This focus on a particular measure of efficiency often becomes an end in itself, driving resource allocation and other management decisions. This may be acceptable if production is limited by the available resources and customers will gladly accept whatever is available. However, resource constraints are not always of paramount importance, especially when compared with the need to fulfill customer needs in order to maintain and increase a customer base. If decisions based on a resource limited perspective have the effect of diminishing customers' perceptions of the organization, then the organization may lose customers. This is counterproductive to a continued growth in market share. Management decisions are nonetheless almost always made using such a resource limited framework.

Figure 2:
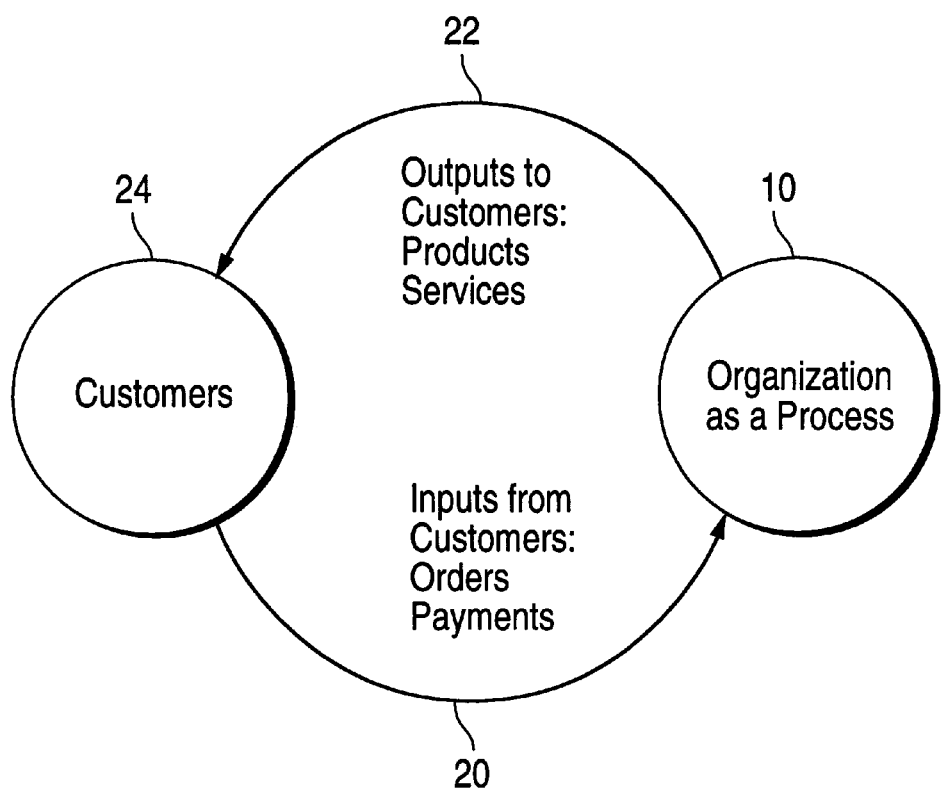
FIG. 2 shows an organization and its associated customer generated inputs and customer directed outputs viewed as a feedback process incorporating the customer.

In customer-driven organizations, the framework for decision making incorporates the concept that the relationship between an organization and its customers is paramount and should be the underlying consideration guiding all organizational activities. This new concept discards the model of an organization as part of a linear process depicted in FIG. 1 in favor of one which views the organization and its customers as being interrelated in a feedback process. In a customer-driven organization, management focuses on ensuring that suppliers and other resources are used to maximize the value derived from the relationship with the customer as this is determined by a set of customer perceived performance measures, and not on minimizing use of a resource. An example of this perspective is shown in FIG. 2, which shows an organization 10 and its associated customer generated inputs 20 and customer directed outputs 22 viewed as a feedback loop incorporating the customer 24. This approach views the entire organization 10 as a single high-level process which is part of a system which incorporates its customers 24.

As shown in FIG. 2, the organization 10 receives an input 20 from a customer 24 and "processes" it in order to produce one or more outputs 22. For example, if the organization 10 is involved in manufacturing a product, the product order is an input 20 and the outputs 22 are a product shipment and a bill for the product and any associated services (shipping, etc.). If the "quality" of the output(s) 22 are satisfactory to the customer 24, they are more likely to issue additional inputs 20 to the organization 10. This establishes a closed loop "feedback" system which, if properly managed, can produce organizational growth.

As noted, one way in which an organization can improve its quality is by reducing the variation in the output of its internal processes, particularly those which directly interact with customers. If the variation in the process output is evaluated in terms of customer perceived performance measures, then the customer perspective will automatically be integrated with the resource allocation efforts of the organization. Therefore, to improve an organization's quality, management should have a method of identifying the organization's macro processes, the boundaries (the beginning and end) of each of those processes, and be able to monitor the performance level of each process, as that performance is perceived by a customer. The present invention responds to this need by enabling managers to identify an organization's macro processes and to model the relationship between the organization and its customers from the customers' point of view.

Another factor pointing to the need for a shift in the framework for management decision making is found in the recent teachings of some business schools. Most business schools formerly taught that the primary purpose of any business was to make a profit. This lead to the conservation of input materials and labor perspective of the model shown in FIG. 1. Recently, however, some innovative business schools have espoused the concept that the primary purpose of any business is to create and keep customers. This new purpose is based on the assumption that if an organization does an effective job of creating and keeping customers, market share will increase and greater profits will naturally follow. This suggests a link between customer perceived quality measures (which influence a customer's desire to continue having a business relationship with an organization) and the traditional measures (profits, etc.) used to direct the resource allocation activities of an organization. Although this is an important concept, at the present time, the business community does not have a logical methodology or device for implementing it on a day-to-day basis. There is no practical tool for executives and managers to use that enhances the likelihood they will allocate the organization's limited resources in a manner which positively impacts the quality of the organization as that quality is perceived by the organization's customers.

The motivation for the present invention is the recognition that organizations would benefit if the decision makers within an organization utilized a device and methodology which systematically identified the customer's perspective and ensured that it was always one of the factors (if not the primary factor) considered when making decisions regarding the allocation of resources to organizational processes. The device and methodology should identify, define, and direct resources to organizational processes (activities) based on how those processes impact customers. In addition, the device should identify measures used to track, trend, and analyze organizational operations so as to best reflect the quality and performance of an organization as perceived by a customer.

The present invention addresses these needs by determining what activities of the organization should be targeted for improvement so as to gain the most benefit from limited resources. In order to identify these activities, the invention simulates the high-level operation of an organization's macro processes, as they are perceived by the organization's primary customer(s). The simulation focuses on the importance and type of the organization's inputs from primary customers, outputs to primary customers, the relationship of these inputs and outputs, measurements and/or indicators related to each input and output which impact a customer's perception of the quality of the organization, and the organization's subprocesses which relate to and support the macro processes.

The invention first groups the organization's departments into high level processes (as perceived by a customer) and then breaks down certain of the high level processes into more manageable subprocesses, where the subprocesses are correlated with the organization's existing functional units or departments. Then, using a method for grading the overall performance level of each process or subprocess, the invention identifies and selects the processes and/or subprocesses to allocate resources to in order to improve the customers' perceptions of the organization's quality. The performance levels of the processes are defined in terms of customer perceived activities or activities which impact a performance measure of importance to customers. The invention also provides the ability to "zoom in" on a given process or subprocess and simulate various of its elements in detail. This provides a better understanding of how each functional unit of the organization operates and its impact on other such units.

Information relating to the above data and other organizational elements is analyzed by the present invention to produce:

1. graphic depictions of how the organization's various processes and associated process elements (e.g., departments) interrelate as seen by the organization's primary customer(s), which in turn are used as a visual analogy to the real world situation in order to perceive, explain, and analyze organizational structure and responsibilities with regard to its impact on customers;

2. graphic depictions of the processes, process elements (e.g., departments), and their interrelationship, which are used as a visual analogy to the real world situation in order to perceive, explain, and analyze a specific organizational substructure and its impact on customers;

3. the prioritized order in which to allocate physical resources to the various processes so as to modify organizational activities to gain the most benefit as perceived by the customer, as evaluated by customer perceived performance measures; and 4. customizable reports which summarize the various process, measurement, and departmental information used in the simulation.

In addition to being used by an organization's management and other personnel on a daily operational and/or planning basis to assist with resource allocation decisions, the present invention can be used as support equipment in business education and training exercises. This includes teaching organizational development, industrial engineering, process management and improvement of macro, cross-functional and other processes, etc. The invention is applicable to any type of organization, i.e., manufacturing, service, health care, government, educational institution, etc. It is also applicable to major sub-elements of such organizations, for example a single plant or division within a multi-plant or multi-division organization.

A major feature of the invention is its novel approach to ensuring that the customer's point of view is the primary frame of reference. By modeling the relationship to the customer as a feedback process (as shown in FIG. 2), the invention forces the user to evaluate each decision regarding an activity modeled by the invention in light of its impact on customers. Viewers of the simulation will necessarily conclude that customers are a critical element to the organization's successful existence. Thus, the invention can also be used as a teaching tool for a wide variety of customer oriented training and education programs.

Introduction to the Organizational Model

Prior to describing the structure and operation of the invention in greater detail, it is important to define certain terminology which will be used in the following discussion.

Definition of Relevant Terms:

Quality is the combination of all product and service characteristics that contribute value to customers and lead to customer satisfaction and preference. It is defined and judged by customers, and can be described in terms of performance measures which can be quantitatively determined;

A process is a collection of logically related activities performed to achieve an outcome;

Macro Processes are the high level activities of an organization that transform inputs from customers to outputs to customers and which interact with the customer;

Front Office Processes are the subprocesses of a Macro process that interact directly with the organization's primary customer(s);

Back Office Processes are the subprocesses of a Macro process that do not interact directly with the organization's customers. Nonetheless, a back office process has a direct impact on the customer's perception of the quality of the Macro process output;

Support Processes are shared between Macro processes and normally don't directly impact the customer's perception of the quality of a organizational output. They are identifiable by the fact they interact with almost all other processes in the organization. Examples include processes involving management of information and data, procurement of supplies and materials, human resources, etc.;

A primary customer is the one for whom the process activities are performed. Secondary customers are other entities who receive outputs from the process as a by-product of generating outputs to satisfy the primary customer;

The end point of a process is that place/time that the primary customer receives all outputs they desired from the organization; and The start point of a process is that place/time that the primary customer provides the inputs which trigger the activities that lead to the production of the desired output(s).

In addition to the above definitions, certain principles or rules are incorporated into the present invention and provide the foundation for its structure and operation. These principles, which are described below, provide guidelines for constructing the various embodiments of the invention.

Principles of the Invention:

For each organizational output to an external customer, all departments that become involved after the initiation of contact by the customer and whose activities occur in time before the delivery of the output to the customer, and which interact directly with the customer, constitute a Macro process of the organization as perceived by the customer;

The importance of a given Macro process relative to other Macro processes is a function of customer perceptions, the revenue generated from customers in a given period of time, and the number of unique customers who receive outputs from the process in a given time period of time. This function varies by organization and can be specified by the user when practicing the invention;

Depending upon complexity, Macro processes can be broken down into one or more "front office" or "back office" subprocesses of the organization;

All organizations are assumed to have generic Macro processes for customer complaints, warranty claims, customer service, payment processing, and price/delivery/terms quotation. Normally, these processes are not complex enough to require being broken down into "front office" and "back office" elements;

The Macro process that collects and analyzes customer complaints and/or warranty claims is assumed in a default mode to be the second most important macro process (in terms of resource allocation) in the organization, although a user may modify this assumption;

Each customer perceived change in activity as the customer's initial input to the organization is processed to produce the output provided to the customer constitutes a boundary between different "front office" processes;

All organizations are assumed to have "support" processes for management of information and data, human resources, procurement of materials and supplies, management of financial resources, and planning;

The source of each input for a given department can be characterized as one of the following: a) an external input from a supplier to the organization, b) an external input from a primary or secondary customer of the organization, or c) an input from another department in the organization;

Each department of the organization is involved in activities that are part of one or more "front office", "back office", or "support" processes;

A "back office" process can begin with an output from a "front office" process and end with an output to the same or a different "front office" process of the same Macro process, to another "back office" process of the same Macro process, to a "support" process, or to an external entity that is not the primary customer;

Process names, at any level, are constructed using a "verb+object" format. The verb is the activity taking place in the process and the object is the primary focus (often a customer) of the activity. Examples include "Purchase supplies", "Pay employees", "Admit patients", etc. This aspect of the model is useful in a teaching mode in which organization managers are lead through the steps in constructing an organizational model;

Within a macro process its functional units are modeled as nodes with the nodes numbered by assigning the number one to the initial contact point the customer makes with the process. The number of the next node in succession in the process is obtained by adding 1 to the previous node number. The highest node number within a macro process is the one that delivers the output to the customer or to a subsequent macro process;

Allocation of resources within a macro process begins at the lowest numbered node and, if all the resources can't be utilize there, proceeds to the next higher node;

Computation of Process Qualification—this is a method of evaluating and ranking the performance of a process. It is helpful in judging the impact of resource allocations on improving a process. A process qualification method identifies a set of verifiable activities or process characteristics that, when successfully achieved, qualify a process as having reached a certain level of performance. It is a way of determining the status of a process by reference to accepted standards. Definitions of a set of process qualification levels and a formula for use in computing intermediate qualification level values will be discussed later;

The owner of a process is the head of the department that controls more of the resources used in the process than any other department involved in the process. This aspect of the invention is important in implementing resource allocation decisions by assigning responsibility and accountability to the efforts to improve the organization;

The output(s) of a subprocess occur at the node it is connected to. The outputs of a Macro process occur at the point of its final contact with the customer;

Process inputs and outputs are named using the construction "adjective(s)+noun". As will be discussed, this method of naming process inputs and outputs is used to assist a user in identifying customer perceived performance measures for the process;

For each adjective in the name of an input or an output, there must be one or more performance measures which characterizes its quality in meeting that adjective;

Measures are categorized according to whether they relate to cycle time, defects, productivity, or another aspect of a process' input or output; and The inputs to any Macro process are the inputs at the lowest numbered node in the process. The inputs to a subprocess of a Macro process are the inputs to the department of that sub-process nearest the lowest numbered node.

Development of an Organizational Model

The present invention may be practiced in several embodiments, with the form used by a particular organization depending to some extent on the customer related information available to the user. For example, the method of the invention may be practiced by means of a properly programmed computer which utilizes a set of previously generated generic input data or a generic model of an organization which may be refined through user input as more specific information becomes available. The method may also be incorporated in a computer program which queries the user to obtain specific, detailed information regarding a customer's perceptions of the activities occurring within the organization prior to generating the organizational model.

In either embodiment, the methodology of the present invention involves the following basic functional steps:

1. Determination and acquisition of information regarding customer inputs to the organization, customer outputs from the organization, and performance measures used by a customer to assess the quality of the organization and its outputs;
2. Determination and acquisition of information regarding the functional departments or units of the organization, and the inputs and outputs of each unit;
3. Construction of a process based model of the organization which identifies the primary macro processes which a customer perceives to occur within the organization when that organization responds to a customer initiated input by producing a desired output;
4. Refinement of the organizational model to show the interrelationships between the primary macro processes, and the relevant front office, back office, and support sub-processes of the organization;
5. If needed, further determination of a set of performance or quality measures which are perceived by customers and used by them to evaluate the quality of the organization and its outputs. Correlation of the identified performance measures with those organizational processes which impact the measures. Ordering of the processes with regards to relative impact on the measures;
6. Determination of the node or process in a macro process having the greatest impact on the quality of the organization as that quality is determined by a specified customer perceived quality measure;
7. Allocation of organizational resources to improve the operation of the determined node or process;
8. Determination of the impact of the resource allocation on the node or process; and
9. Repetition of the relevant previous steps to allocate resources to other primary or secondary nodes or processes.

An apparatus suitable for implementing the method of the present invention is one comprising the following elements:

1. A storage means for storing a database or databases containing data representative of:

A. Customer specific data customer inputs to the organization which initiate operations leading to the production of desired outputs, a set of customer perceived quality or performance measures used by customers to evaluate the quality of an output of the organization;
    B. Organizational specific data a listing of the functional units of the organization and the inputs and outputs of each unit. This can take the form of:
    Generic Macro processes found in every organization, organization unique Macro processes found only in organizations in the same industry or sub-industry, support processes found in every organization, unique support processes found only in a specific organization; and
    C. Quality improvement resources (personnel, equipment, funds, etc.) available for allocation to the processes of the organization, with the resources being correlated with the process or type of process to which the resources are applicable;

2. Computational or processor means for tracing the flow of a customer input through the organization to produce a desired output, and for identifying the macro processes of the organization involved in producing the output (if the processor is used to generate a set of customer perceived processes based on querying a user of the invention, this may be supplemented by an analysis tool which maps the customer perceived processes to the departments or activities contained in the organizational process database);
3. A graphical tool capable of displaying the relationships between the customer input, organizational output, and organizational structure information in the databases in accordance with a set of rules or a specified search strategy used to trace the flow of inputs and outputs through the organization;
4. Computational or processor means capable of determining the qualification level of a selected process;
5. Computational or processor means for use in prioritizing and selecting processes to improve, where these processes will result in the greatest increase in customer perceived quality of organization;
6. Computational or processor means capable of mapping (relating) the existing departmental structure as evidenced by the information in the organizational database to a customer perceived process structure (optional); and
7. Data acquisition means linked to other organizational systems to obtain data for evaluating selected performance measures, with the evaluated measures being incorporated in the above prioritizing and selection of processes to improve.

In order to construct the organizational model, the organization is first viewed as a single process, with the associated inputs from and outputs to a customer of the organization (see FIG. 2). This approach views the entire organization as a single high-level process which is part of a system which incorporates its customers. The organization receives an input from a customer and "processes" it in order to produce one or more outputs. If the output(s) meet the performance measures of importance to the customer, they are more likely to issue additional inputs to the organization or refer other potential customers to the organization.

As noted, two basic types of information are needed to construct the organizational model used to make the resource allocation decisions in accordance with the present invention. The first type of information relates to the customer's interactions with the organization (customer inputs, outputs, and performance measures). The second type of information relates to the organizational structure (functional units, inputs, outputs of each unit). The two types of information are used to trace the processing of the customer input through the organization and identify those functional units which a customer perceives to be involved in producing the desired output.

The customer input which initiates the process(es) within the organization which produce a desired output may be selected from a generic set of inputs common to the type of organization being modeled, or may be provided by customer responses to posed queries. The input can also be identified by allowing a user of the method to modify or expand an existing set of generic inputs. The set of inputs can be automatically updated by the system as potential customer inputs are identified by the system through an analysis of departmental inputs. It is also important to identify the organizational output desired and a set of performance measures which the customer uses to evaluate the quality of the organization. The outputs provide the products or services which a customer seeks to obtain from the organization, and hence provide the basis for establishing a relationship between them. The outputs also provide those aspects of the organization which a customer will evaluate in terms of the customer perceived performance measures. The information described is used by the present invention to trace the flow of information and resources through the organization, as the flow would be perceived by a customer, and to construct a model of the organization which can be used to guide resource allocation decisions.

However obtained, the customer related information allows the organization to be modeled at the top level as a black box which has a customer action (order, inquiry, complaint) as an input, processes the input (with the processing method depending to some extent on the manner in which the input is made), and produces the desired output.

The organization related information can be obtained by using a generic set of department types with their associated inputs and outputs or a set of data specific to the organization's industry (manufacturing, financial, medical services, etc.) which is specialized to the organizational structures and functions common to that industry. The data may also be obtained by querying an organization's managers regarding the functional units and associated inputs and outputs of the organization. Once the customer and organizational data are collected, the customer perceived macro processes of the organization can be determined.

Figure 3:
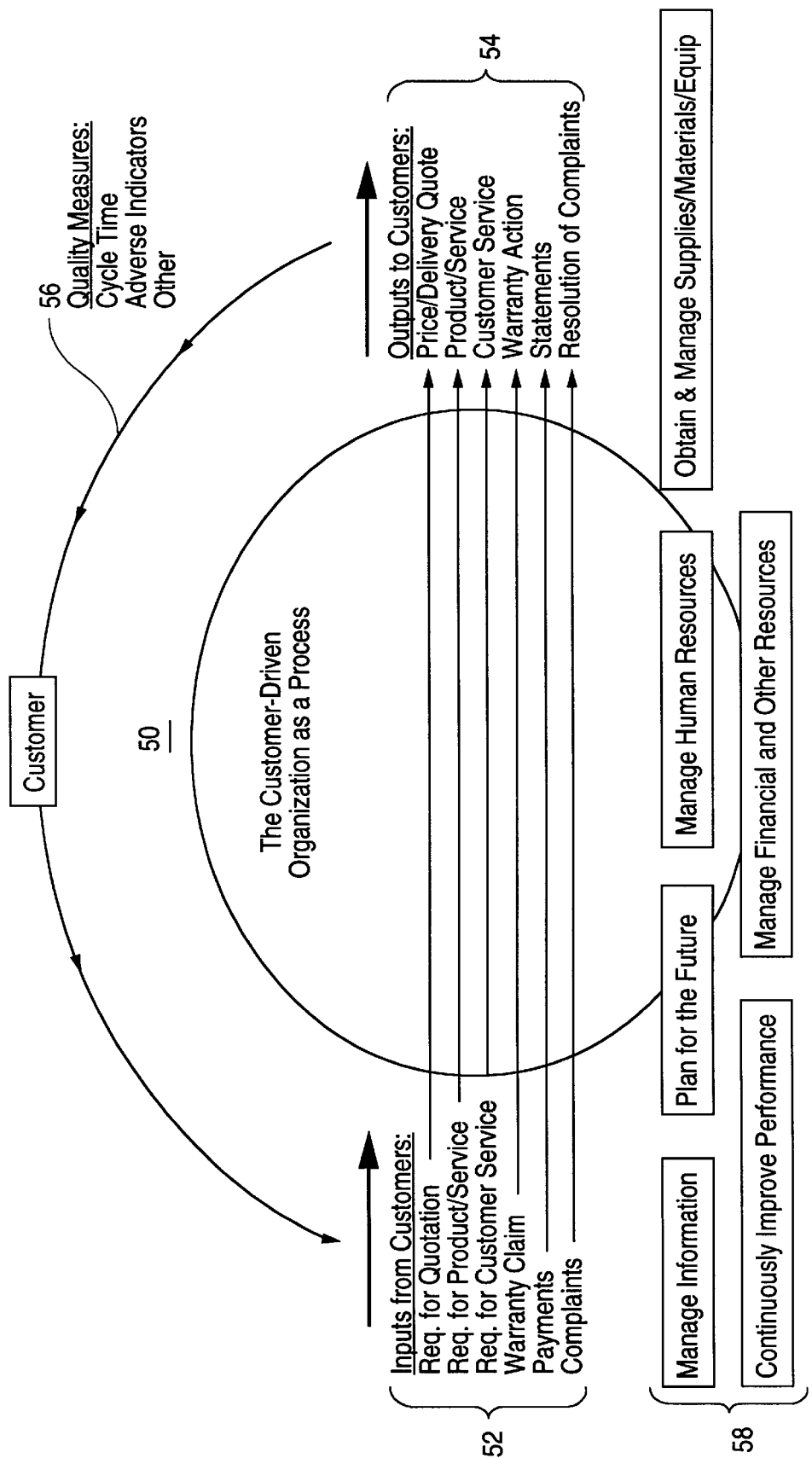
FIG. 3 shows a generic model of an organization having a set of customer inputs, organizational outputs provided to customers, and performance measures perceived by a customer.

The result of using generic data to model an organization as a process which includes the customers in shown in FIG. 3, which shows a generic model of an organization 50 having a set of customer inputs 52, organizational outputs provided to customers 54, and performance or quality measures perceived by a customer 56. The bottom of the figure shows a generic set of support processes 58 typically used by an organization. The relationship between the organization and its customers is depicted as a feedback process, in accordance with the present invention.

Determining the Macro Processes of an Organization

One means of constructing the detailed organizational model of the present invention (which is an extension of the model shown in FIG. 3) is to correlate the departments within the organization (obtained from the organizational related data) to the functional activities which a customer perceives to occur as their input is processed to produce a requested output. By identifying performance measures which reflect the operation of those activities, this method assists in determining which organizational departments impact the performance measures of concern to the customer. It follows that allocating resources to these departments in order to improve those performance measures will improve the organization's quality as it is perceived by a customer.

Although the invention can be practiced in multiple embodiments, the following discussion is devoted to describing a data processing system which automates the generation of the organizational model and the resource allocation process. However, the method of the present invention can also be practiced in the form of markers or tokens which represent the various functional units within an organization. The inputs and outputs of each unit can be identified by a coding method (color, size, etc.) which indicates how the functional units are linked to depict the flow of information and resources through the organization. In either form, this enables a network model of the organization to be constructed.

Figure 4:
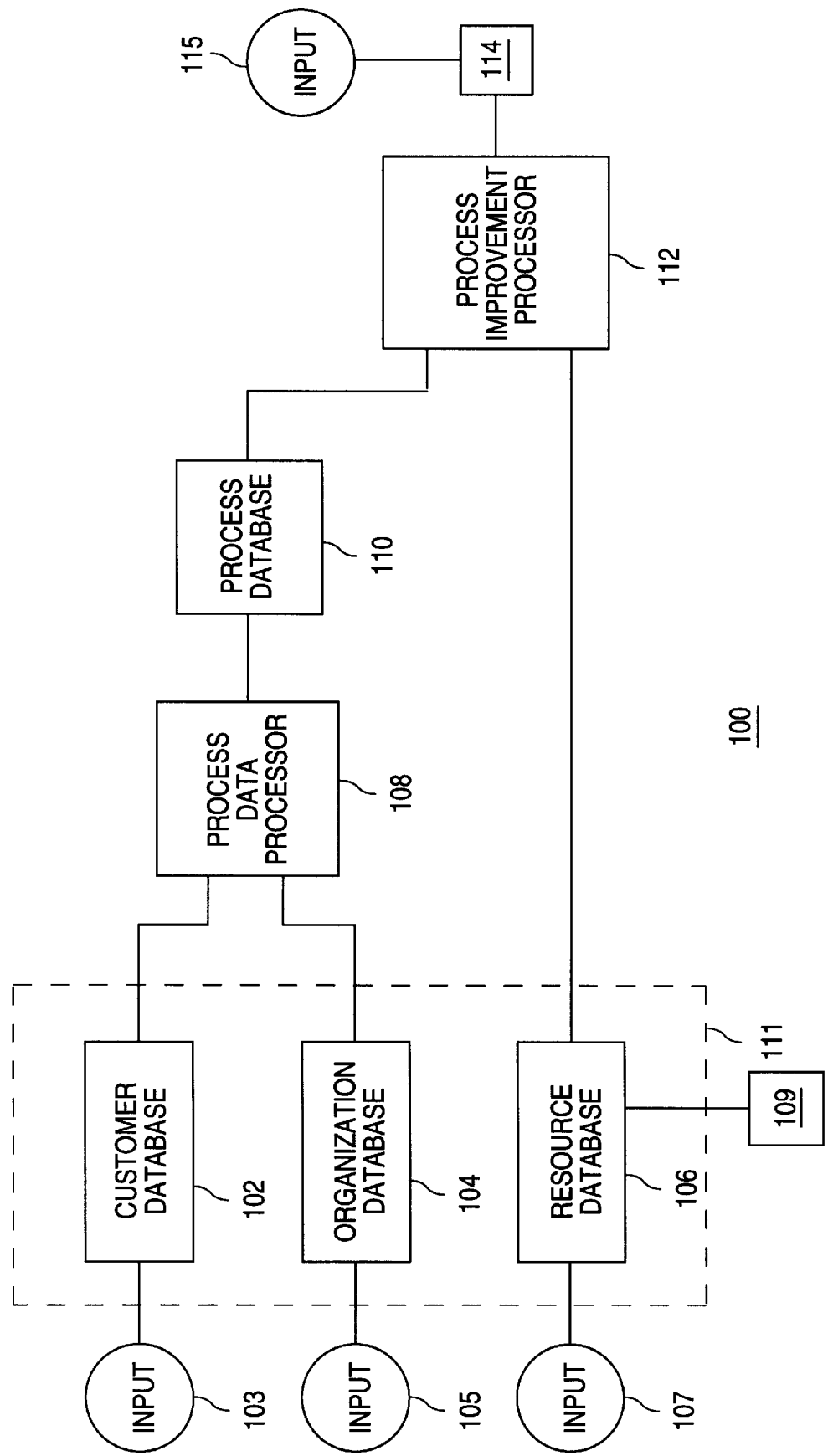
FIG. 4 is a block diagram showing the components of an integrated process improvement management system for implementing the methodology of the present invention.

FIG. 4 is a block diagram of an integrated process improvement management system 100 for implementing the resource allocation methodology of the present invention. As indicated in the figure, system 100 uses both customer specific information and organization specific information to model the organization, and to determine where to allocate resources. The customer specific information is contained in customer database 102, and the organization specific information is contained in organizational department database 104. A third source of input data is provided by resource database 106 which contains information regarding the resources each department within the organization has available for use in improving the quality of the organization. Databases 102, 104, and 106 are typically stored in a suitable storage device 111 which is accessible by the processing means of the present invention.

It is noted that the information contained in databases 102, 104, and 106 may be in the form of generic information applicable to any type of organization, in the form of industry specific information applicable to the organization, or in the form of responses supplied by customers and organization department managers to specific questions. The data may be provided by dedicated input means (elements 103, 105, and 107 in the figure) such as a data input terminal or screen (in the case of user specified inputs), or the output of a data acquisition and processing system which senses, collects, and processes the required organizational information.

Supplemental or updated data may also be entered from a terminal in response to posed questions in order to modify the existing databases. The resource database 106 may be updated by a separate resource data collection system 109 which dynamically determines the availability of resources to invest in improving the organization's processes as a function of the previous resource allocations decisions made using the present invention. Resource data collection system 109 may utilize a standard optimization algorithm or other suitable method for analyzing complex organizational models and determining how to allocate available resources based on customer identified performance measures taken into account by the algorithm or method. For example, the customer identified measures may be used as weighting factors in determining a desired routing of resources to a set of processes which are to be improved. Similarly, although customer related data changes relatively slowly, it may be entered from a terminal, from separate automated systems, or from a combination of the two (see input means 103 in the figure).

If it is desired to construct customer database 102 by querying customers of the organization, an example of questions suitable for obtaining the required information which can be input by means of input element 103 are:

Questions for Constructing Customer Database

What primary output from the organization are you interested in obtaining (check one)?
_ A quotation regarding price, financing options, delivery, or other terms.
_ A product or service (enter code): (select the product/service code, SIC code, etc. from the attached list)

Indicate the importance of this output relative to all others provided to you:
_ High
_ Medium
_ Low Indicate up to 5 performance measures you consider important in your assessment of the quality of this product or service. Indicate the relative importance of each measure (on a scale of 1 to 5) and the standard (characteristics) expected.

Measure name: _ Standard of performance expected: _ Importance: _ Measure relates to: _ Time, _ Defects, _ Other
_ Warranty service related to a previously obtained product or service
_ A nonwarranty service related to the previously obtained product or service
_ A payment related action (e.g. new or revised bill, credit, etc.)
_ File and/or obtain action via a complaint
_ Other (specify):

What was the means you utilized to establish initial contact with the organization in order to obtain the output identified above?
_ Telephone call (specify the number utilized):
_ FAX contact (specify the number utilized):
_ E-mail contact (specify the address utilized):
_ In person contact (specify location and person)
_ U.S. mail contact (specify the address utilized):
_ Other (specify the mode and details):

The responses to these questions are used to determine the expected output of the organization (and its associated customer perceived performance measures), and the entry point(s) into the organizational model. This information is stored in storage device 111 in the form of database 102.

If it is desired to construct organizational department database 104 by querying managers of the organization, an example of questions suitable for obtaining the required information which can be input by means of input element 105 are:

Questions for Constructing Organizational Database

Outputs to and inputs from external customers of the organization:
What outputs do you provide directly to external customers?
For each output to external customers indicate up to five measures/indicators you believe best reflect the customer's assessment of the quality of the output. Indicate the relative importance you believe the customer attributes to each measure (on a scale of 1 to 5) and the standard (characteristics) expected.
Measure name: Standard of performance expected: Importance: Measure relates to: Time, _ Defects, _ Other What inputs do you need directly from external customers of the organization to generate the above output(s)?
For each input from external customers indicate up to five measures/indicators you believe best reflect your assessment of the quality of the input. Indicate the relative importance you attribute to each measure (on a scale of 1 to 5) and the standard (characteristics) expected.
Measure name: Standard of performance expected: Importance: Measure relates to: _ Time, _ Defects, _ Other What other significant inputs do you need in order to provide the outputs to customers and indicate the source of the input(s) (e.g., another department, external supplier, etc.)?
For each input indicate up to five measures/indicators you believe best reflect the your assessment of the quality of the input. Indicate the relative importance you attribute to each measure (on a scale of 1 to 5) and the standard (characteristics) expected.
Measure name: Standard of performance expected: Importance: Measure relates to: _ Time, _ Defects, _ Other What other significant output(s) do you provide (e.g., raw materials to the manufacturing shop floor, sales plans to sales, etc.) and to whom do you provide it?
Output: Provided to: (enter code from the attached list)
For each output indicate up to five measures/indicators you believe best reflect the recipient's assessment of the quality of the output. Indicate the relative importance you believe they attribute to each measure (on a scale of 1 to 5) and the standard (characteristics) expected.
Measure name: Standard of performance expected: Importance: Measure relates to: _ Time, _ Defects, _ Other What other significant input(s) do you need in order to provide these outputs and from whom do you obtain it?
Output: Obtained from:
For each input indicate up to five measures/indicators that best reflect the your assessment of the quality of the input. Indicate the relative importance you attribute to each measure (on a scale of 1 to 5) and the standard (characteristics) expected.
Measure name: Standard of performance expected: Importance: Measure relates to: _ Time, _ Defects, _ Other This information is stored in storage device 111 in the form of database 104. As noted, database 104 may also be constructed using a generic set of departmental units, a set specific to a particular industry, or even a standard organization chart which is supplemented by noting the inputs and outputs for each department.

Process Data Processor 108 is a digital computer or other computation means having stored therein a computer program which implements the data processing operations needed to generate a list of organization macro processes perceived by a customer to occur when a customer desired output is produced. Processor 108 also acts to "breakdown" those processes into their constituent parts, and to correlate those parts with the organizations's existing functional departments. These data processing operations are described in the flowchart of FIG. 5.

An output of process data controller 108 is the contents of process database 110. Database 110 contains a linked list of the organization's departments representing those which a customer perceives to be involved in processing the customer input to produce the desired output. Database 110 also contains those departments which interact directly with a customer and have an impact on the customer perceived performance measures of the organization, those departments which have been identified as front or back office elements of the macro processes, and those departments involved in the activities of the front and back office elements. The information contained in database 110 is structured to represent the interrelationships between the identified customer input, organizational output, and the organization's functional units involved in processing the customer input. The structure includes connecting links (pointers from and to connecting processes) between the functional units which represent the order in which the inputs and outputs of the units occur as the customer output is produced. The use of links between the functional units and flags indicating the source of the linked data (what database the information was obtained from) allows process data processor 108 to traverse and update database 110 as a user makes changes to the information contained in customer database 102 and organizational database 104. Such a structure also allows a processor to trace the flow of a customer input through the organizational units which correlate with the customer perceived activities.

Figure 6:
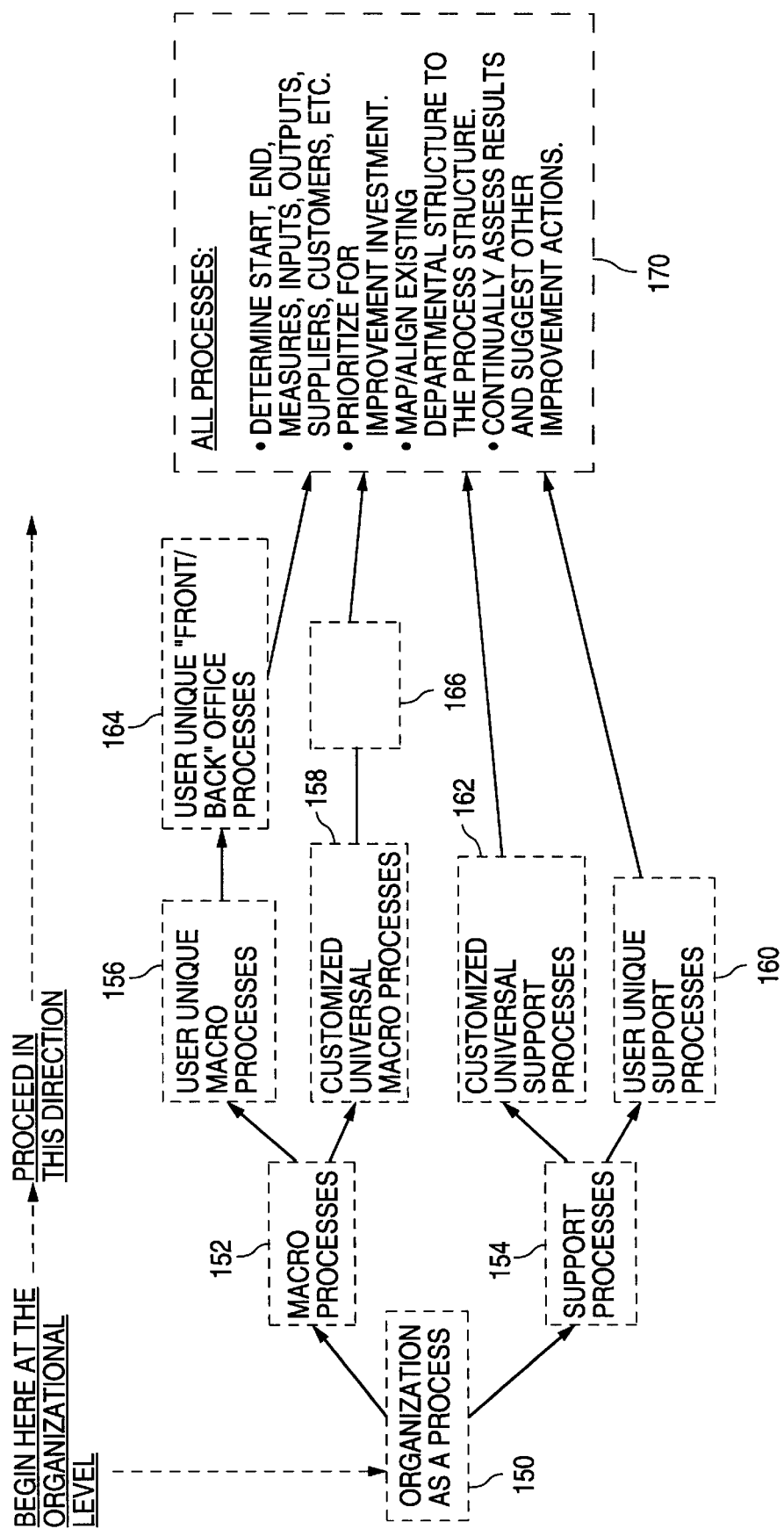
FIG. 6 is a graphic representation of how an organization may be decomposed into its constituent processes and subprocesses in accordance with the present invention.

FIG. 6 is a graphic representation of how an organization may be decomposed into its constituent processes and subprocesses using the present invention. As FIG. 6 indicates, an organization is first viewed as a process (box 150). This overall process is then divided into macro processes (box 152) and support processes (box 154). The macro processes are then divided into macro processes unique to a particular organization (box 156) and macro processes common to most organizations (box 158), which may be customized to the industry in question. The support processes are similarly divided into support processes unique to a particular organization (box 160) and support processes common to most organizations (box 162), which may be customized to the industry in question. The macro processes unique to a particular organization are then broken down into their constituent front office and back office processes (box 164). This information is also obtained for the macro processes common to most organizations (box 166). The processes identified in the previous steps are analyzed to determine their start and end points, performance measures, and (if necessary) to map the processes to the existing departmental data contained in organizational database 104. These processing steps are represented by box 170.

After identifying an organization's macro processes and breaking them down into the constituent sub-processes, the next step is to determine which processes or sub-processes to allocate resources to in an effort to improve the customer perceived quality of the organization. This is done by means of Process Improvement Processor 112.

Process Improvement Processor 112 is a digital computer or other suitable processing means having stored therein a data processing program used to determine which of the organizational processes contained in process database 110 is to be improved by having resources allocated to it. These data processing operations are described in the flowchart of FIG. 7. If a digital computer that supports multi-tasking is available, it alone may be sufficient to perform the operations of both processors. Information regarding the status of the process(es) being improved 114 is provided to Process Improvement Processor 112 via terminal, automated systems, sensor readings, or a combination of these input means 115. Processors 108 and 112 can also be comprised of hardwired logic circuits designed to carry out the respective procedures, a plurality of parallel processors, or a plurality of suitably constructed programmable linear arrays.

The user may initialize processing system 100 prior to first use. The initialization activity can be used to customize the customer questionnaire so as to list the products and/or services the organization offers and related measures of performance believed important to the customer. The initialization procedure also confirms the default macro and support processes used in the organizational model. In addition, users are able to designate support processes in addition to the default ones included with the system.

Figure 5:
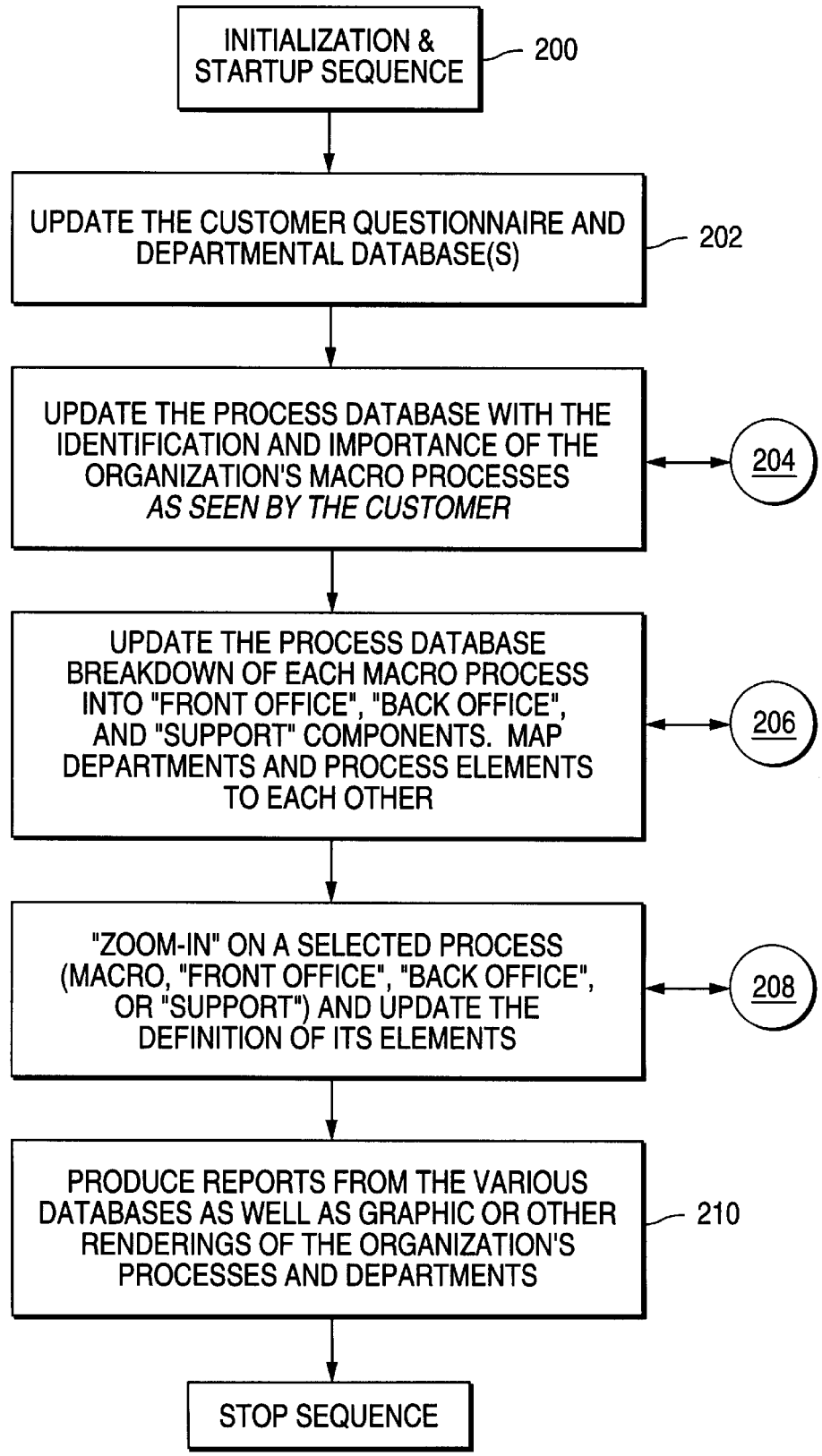
FIG. 5 is a flowchart showing the data processing operations used to generate a list of the organization macro processes perceived by a customer to occur when a customer desired output is produced, to "breakdown" those processes into their constituent parts, and to correlate those parts with the organizations's functional departments.

The data processing flow of FIG. 5 begins with initialization and startup sequence 200. The data processing operations depicted in FIG. 5 are intended to be used by one skilled in the art to form the basis for developing a computer program or logic structure for performing the processing operations of process data processor 108. As noted, startup sequence 200 can be used to select which of several baseline organizational models is to be used in the method, to select which of several sets of customer input data is to be used to determine the customer input, desired output, and performance measures, or to query the user and obtain responses to organization specific questions which focus on the inputs, outputs, and performance measures specific to an organization or industry.

As an example, for the case of a manufacturing organization, a generic set of data might be:

Customer Input(s): Product Order, Request for Product Information, Complaint, Payment of Bill, etc.

Customer Outputs: Product Ordered, Information in response to inquiry (brochure, datasheet, etc.), Acknowledgment of complaint (letter, description of action in response), Receipt for payment, etc.

Performance Measures: Correctness of product received, Condition of product, Promptness of response to order, complaint, inquiry, Service indicators arising from contact of customer with organization's representatives, etc.

Similar sets of generic data can be constructed for service industries or for specific types of organizations (hospitals, banks, legal services providers, etc.) within the broad categories of product or services providers. The generic data set can be superseded or modified by user inputs to questions of the type previously discussed.

Note that even the generic data shown above can be used to construct a basic model of an organization. The organization can be visualized as a "black box" having the indicated inputs and outputs, with the quality of the outputs being determined by the performance measures (see the generic organizational model of FIG. 3). This black box can then be broken down into multiple blocks which process the customer input, supply the materials or information needed to produce the product or service, and ship the product or provide the service to the customer. Each of these blocks can then be expanded using the contents of organizational (departmental) database 104 by linking the output of one block to the input of another block. The customer perceived performance measures can be linked to (correlated with) the organizational processes which impact those measures (based on the variables which characterize the output of the processes and the relationship between the performance measures and those variables). This provides a means of associating the actions of the organization's departments with the impact on a customer's perception of the quality of the organization. The performance measure associations can be used to identify those processes or activities of most importance in the flow of inputs and outputs through the organization.

Returning to FIG. 5, the customer database is updated at step 202 to reflect any information added or modified by the customer in response to inquiries regarding the customer inputs and desired organizational outputs, and the departmental database is updated to reflect information added or modified by the organization's managers regarding the inputs, outputs, and functions of the departments. As described, this data is used to identify the macro processes occurring within the organization as they are perceived by the customer when obtaining a desired output of the organization.

According to the definition of a macro process given previously, macro processes are the high level activities of an organization that transform inputs from customers to outputs to customers and which interact with the customer. Thus, the macro processes within an organization are those departments which perform the functions of receiving customer inputs, producing customer outputs, or otherwise directly interacting with customers. The macro processes can be determined from the information contained in the databases in one of the ways to be discussed, which act to map the organization's departments to the processes which a customer perceives to occur when processing the customer input.

The mapping of the organization's departments or functional units to the processes which a customer perceives to occur can be accomplished by at least two approaches. The first is to construct the organizational database 104 and use the listed inputs and outputs of each department to correlate the customer input and desired output with those departments which are part of the process flow through the organization responsible for using the customer input or producing the customer output. This is done by tracing the customer input to the department(s) which require that as an input, following the output(s) of that department or departments to other departments which utilize those outputs as inputs, and continuing this tracing process until the desired customer output is produced. The identified departments can then be grouped into functional units (with a functional unit being all those departments at the same processing level of the input), and supplemented by other departments which interact directly with the customer. The resulting set of departments or functional units is then accepted as those which a customer would perceive to be involved when dealing with the organization. The set of functional units can be added to, subtracted from, or ordered based on the units which directly impact a specific performance measure.

The above description of how to construct the model of the customer perceived macro processes within an organization used the customer input as the starting point and then traced that through the departments which acted on that input to produce outputs in the chain of departments leading to the production of the desired customer output. This can be termed the "forward chaining" approach to constructing the organizational model of the macro processes.

The desired customer output can also be used as the starting point, with the method then tracing the organizational flow backward to the department(s) which provide the output(s) which serve as the input for the department producing the customer desired output as an output. This process can be continued until all departments in the flow between the customer input and the desired output are identified. This can be termed the "backward chaining" approach to constructing the organizational model of the macro processes. A combination of the two approaches can also be used, with the two approaches connecting at some intermediate process level.

The resulting model of the organizational as a set of linked processes can be modeled by analogy to a network having nodes and interconnections. By weighting the interconnections according to the impact of a process on a specific performance measure, standard network analysis or neural network models can be used to evaluate the operation of the organization. Various paths through the organization or various resource allocation schemes can be evaluated to determine which optimizes the customer perceived performance measures.

It is noted that computer programs and algorithms used in the field of artificial intelligence and neural networks can be used to perform this tracing of the process flow through the organizational departmental data to identify the customer perceived macro processes. These type of programs are known as inference engines and would be especially helpful in modeling complex organizational structures.

A second approach to mapping the organization's departments to the processes which a customer perceives to occur is by placing the user of the present invention in the position of a customer and asking the user to trace the flow of the customer's input through the organization from the perspective of the customer. As before, the customer supplied input must be tracked through the organization's functional departments until the customer desired output is produced. The user may be assisted in this process by being prompted at various stages to consider what aspects of the organization a customer has direct contact with and how those features of the organization process the customer input to obtain the desired output. This can be supplemented by using generic functional units of an organization and allowing a user to select or modify those units. The information obtained from the user is used to construct customer database 102. In this case, the contents of customer database 102 can be used as the input to process data processor 108 directly, or the customer perspective data can be refined by comparison with the contents of organizational database 104, using the inputs and outputs of each unit to correlate the contents of database 102 and 104. Process data processor 108 will then break down the identified macro processes into the appropriate front office, back office, and support processes. This approach is particularly useful in the education and training of an organization's managers, as it follows the flow of materials through the organization and forces them to visualize the operation of the organization from a customer's point of view.

In addition to determining the macro processes of the organization from the customer's perspective, process database 110 is updated at step 204 to reflect the current set of macro processes. The set of macro processes is then ordered in terms of customer perceived importance of the processes to the performance measures which impact the customer's perception of the quality of the organization. As noted, these performance measures may be obtained from querying customers or from a generic set of measures used to characterize the activities of the organization which interact with customers.

The set of processing operations which occurs during step 204 may be summarized as:
I. Use the Customer Database to Identify the Macro Processes (according to one of the described methods)
   A. Propose a name for each process but allow the user modify or change it.
      1. Ensure the name conforms to the "verb +object" rule.

II. Update the process database to reflect the results

III. Compare and Order the Macro processes according to customer perceived importance (impact on a specified performance measure).
   A. Force the complaints and warranty claim macro processes to be number 2 & 3 in importance (for some organizations, the user can be allowed to re-order these macro processes as desired)
   B. Allow the user to customize the ordering scheme used to evaluate macro process importance.

IV. Repeat all the above steps until there is no change in outcome

V. Note the measures customers perceive as important for output(s) of each of the Macro processes.

VI. Update the process database and display the results.

After completion of this set of operations, each macro process identified may need to be "broken down" or decomposed into its constituent "front office" or "back office" processes, where these terms have been defined previously. This processing is performed by process data controller 108 using the information contained in customer database 102 and organizational database 104. This operation is designated as step 206 in FIG. 5. During this step each macro process is analyzed to determine which front office and back office processes are subprocesses of the macro process, and the organization's departments are correlated with those subprocesses. The set of operations which occurs during step 206 may be summarized as:

I. Use the output to the customer of the Macro process to access the department data base to locate the department that provides the output in question directly to the customer. This is the initial department in question.

II. Utilizing the input(s) required by the department in question, access the department and process databases to locate every other department that provides output(s) identical to the input(s) needed by the department in question. Each match identified constitutes a node.
   A. If no match is found, test for the possibility of the input being provided by a supplier to the organization. If a match, note the source as being a supplier and mark the path as "supplier terminated" and as a "back office" path.
   B. If no match is found, test for the possibility of the input being provided by the customer of the Macro process. If a match, note the source as being the customer and mark the path as a "front office" path.
   C. If no match is found, mark the path as a "dead end" path.

III. Repeat the previous step for each input for each department identified in all prior iterations of the previous step until all possible nodes and paths have been identified for a given macro process.

IV. Flag the various departments according to whether they belong to a "front office" or a "back office" process.
   A. Beginning with the point of initial contact with the customer and moving along each path of nodes that ultimately reach the point of output to the customer, mark each department that has direct contact with the customer as a "front office" department.
   B. Mark each department encountered in the prior step that is subordinate to a "front office" department as a "front office" department.
   C. Mark each department encountered in the prior two steps that do not have direct customer contact and which is not subordinate to one that does as a "back office" department.
   D. Mark each unmarked department that is adjacent to a marked department as a "back office"/"support" department. Repeat this step until all relevant departments have been marked.
   E. If any of the departments marked in the previous step terminate in a "dead end", back track toward the "front office" departments until a node is encountered that intersects with a path leading in a different direction. Designate the departments encountered during the back tracking as "dead end".

V. All departments thus identified which are "front office" departments and which:
   A. are contiguous or parallel and provide the same output to external customers are grouped into the same categories so as to thereby reduce the total number of nodes. Each category is named (ensure conformance to the verb+object naming rule) by the user and constitutes a "front office" process.
   B. haven't yet been categorized when using the previous criteria are each placed in separate user named categories (ensure conformance to the verb+object naming rule) constitute distinct "front office" process.

VI. Repeat all the above steps for each macro process and thus identify all "front office" and "back office" processes.

VII. Evaluate all "dead end" and/or any remaining unmarked departments for the possibility that the paths they reside on lead to a "support" process.
   A. Beginning with the last department in a "dead end" path, compare its inputs and outputs with those of the default "support" processes. If there is a match, designate the department as a "support" department.
   B. Repeat the previous step for each department in the path until one is reached that is marked "front office" or "back office".
   C. Any department not yet marked and whose outputs match those of a default "support" process is marked as a "support" process department.

VIII. Any department as yet unmarked, or marked as "dead end", after completing all the above steps is to be marked as belonging to an "unknown" process. The user is given an option at this point to manually mark any such department as belonging to a previously identified "front office", "back office", or "support" process.

IX. Update the process database and display the results.

After the macro processes have been decomposed into their constituent subprocesses in step 206, each macro process and each of the identified subprocesses may be defined further by using step 208. In this step (termed a Process Profile®), a process or subprocess (termed an object process in this context) is selected and its elements are defined and updated. This involves assigning an owner (responsible party) for the object process, determining the outputs produced by the object process (by accessing organizational database 104), determining the inputs required by the object process, ordering the outputs and inputs (based on criteria such as volume, profitability, etc.), and determining the resources currently allocated for improvement of the process (by accessing resource database 106). This step is important in implementing process improvement efforts, by helping to properly direct and monitor the resources to be allocated to a process.

The elements used in further defining a process of any kind (Macro, support, front/back office) are generally the same: start point, inputs, suppliers, end point, customers, outputs, and performance measures. These are identified using a method that is similar to the steps used to identify the performance measures. The process definition is displayed graphically to aid the user's understanding of the various elements, their relationship to each other, and to gain additional insight regarding the appropriate measures of process performance. Construction of the Process Profile® requires the user to state the purpose of the process in a manner which includes the perspective of the primary customer of the process. The steps are conducted in the order shown with the caveat that any step may be skipped and returned to again on a subsequent pass. The user is initially shown a blank Process Profile® (see FIG. 10-A), which is updated to visually reflect the progression through each of the following steps. FIGS. 10-B, 10-C, and 10-D are examples of completed Process Profiles for several processes found in different industries. The general steps involved in developing a Process Profile® are:

1. State the purpose of the process;
2. Identify the owner of the process (criteria related questions prompt the user);
3. Outputs to primary and other customers are stated in "adjective+noun" format;
4. The process endpoint for the primary customer is stated;
5. Measures related to each output are identified using the above method;
6. Inputs from the primary customer and other suppliers are stated in "adjective+noun" format;
7. The process start point for the primary customer is stated; and
8. Measures related to each input are identified using the above method.

The set of operations which occurs during step 208 may thus be described as:

I. Evaluate all departments involved in the process and determine the owner of the process based on the rule for ownership.
II. Accept/confirm the text purpose statement for the process.
III. Determine the outputs to primary customer(s)
IV. Compare and order the outputs according to their importance relative to each other for a given customer.
V. Compare & Order the process output(s) according to importance
VI. Accept descriptive text declaring the Process End Point for the primary customer
VII. Compare and order the Process Output measures according to their importance to customers.
VIII. Determine the inputs needed by the process
IX. Compare & Order the process inputs(s) according to importance
X. Access the resource and departmental databases to determine the current allocation of resources to the process
XI. Accept descriptive text declaring the Process Start Point for the primary customer
XII. Compare and order the Process Input measures according to their importance to the process owner
XIII. Update the process database and display the results.

After completion of step 208, reports or charts describing the structure of the organization can be produced at step 210 to assist managers in visualizing the processes and subprocesses of the organization which a customer perceives to contribute to the production of a desired customer output. The reports or charts focus on the relationship between the organization and its customers and assist in allocating resources to those processes of an organization which have the greatest impact on the customer perceived performance measures. The methodology of the present invention provides a management team with both tangible and intangible results. The tangible results are represented by the pictorial representation of the overall structure and process flow of the organization. This can be used to identify those organizational structures which require quality improvement and to prioritize those activities based on which structures will have the greatest impact on customer performance measures.

The intangible results of the analysis are an increased knowledge of the organization's processes and their interrelationships, and of how customers interact with those processes. Together, the tangible and intangible results provide a method for improving the overall quality of an organization by assisting with the implementation of specific quality improvement activities.

In summary, the information regarding the organizational structure obtained by practicing the present invention may be used to:

1. Determine the order in which to initiate quality improvement efforts;
2. Determine which members of the organization are to be involved in the various quality improvement efforts;
3. Determine which of the customer quality measures to monitor and analyze in assessing quality improvements; and
4. Determine how to allocate available resources to improve the quality of the organization.

Allocation of Resources to Organizational Processes

Once the macro processes of an organization have been identified and their interrelationships determined (i.e., an organizational flowchart has been constructed), the management team must prioritize the processes to determine the order in which they will be improved. It is very important that each process improvement effort meet with success so as to ensure that the organization gains confidence in its ability to utilize quality improvement methods. Therefore, the first criterion for beginning the improvement of any process is that the effort have a high probability of succeeding. In part, this means the scope of the effort should be well defined and manageable in breadth. In addition, the organization must be committed to providing the improvement team with timely access to a sufficient level of the quality improvement resources needed to support the effort.

Once this is assured, the next criterion for selecting a macro process to improve is its proximity to the beginning of the flowchart (i.e., the process furthest "upstream"). This is because errors that occur upstream are often compounded as the activity moves through the flowchart. In fact, in an organizational flowchart whose direction is from left to right and top to bottom, the further to the left and toward the top of the flowchart a process is located, the better candidate the process is for improvement.

Another consideration for selecting a macro process to improve is the volume of transactions moving through a given process. Ideally, the processes with the highest transaction volume should have priority for improvement over processes with lower volume. If several processes have the same volume levels, then the one furthest "upstream" should be improved first.

As the improvement effort moves downstream (i.e., to other sections of the chart), choosing between processes of equal volume should include consideration of the number of inputs and outputs each process has. A "hub" process (one with many inputs and outputs) should be selected for improvement over one with just one input and one output. This is because defects in a "hub" process will usually impact many more processes downstream than will a defect in a process with just one input and one output.

Additional considerations (i.e., tie breaking considerations) for selecting a macro process to improve are the speed with which a process is likely to be improved and the amount of benefit the organization will receive upon conclusion of the improvement activity.

A factor that should always be considered when determining the order in which the macro processes are to be improved is how the identified macro processes impact the organization's performance (quality) measures. As mentioned, quality or performance measures are important because customers usually judge the quality of an output by referring to these specific standards or values.

As discussed, the performance measures may be obtained from the responses provided by customers or departmental managers to the questions described previously. If this information is not available, a generic set of organizational quality measures such as the "eight dimensions" of quality (performance, features, reliability, conformance, durability, serviceability, aesthetics, and perceived quality) advocated by D. Garvin in "Competing on the Eight Dimensions of Quality", Harvard Business Review, November–December 1987 may be used. The "eight dimensions" can also serve as the basis for generating a larger list of quality measures by querying customers as to other measures suggested by the "eight dimensions".

As has been discussed, quality measures are important because they can be used to monitor the organization's quality as it is perceived by customers. In order to allow sufficient time to collect and analyze data relevant to each measure, the quality measures must be identified, and data collection and analysis activities begun, in the early stages of the organization's quality improvement efforts. The information that is developed can then be used to assist with prioritizing the macro processes, monitoring the quality improvement efforts, and deciding on the allocation of resources.

Each quality measure can be traced to one or more macro processes that affect that measure's value. If the macro processes which affect a measure's value are improved, the measure will reflect the improvement. Thus, managers can monitor the organizational quality measures to assess the status of the overall quality improvement effort. The customer point of view regarding the structure and operation of the organization is incorporated into the present invention by means of the performance measures, because the macro processes which impact the measures are those which determine how a customer perceives the organization. By allocating resources to those processes, a customer's positive impressions of the organization will be increased, producing a greater market share and other desired benefits.

In addition, if it is decided that the organization should improve its performance as reflected by a particular quality measure (e.g., as a means of improving customer satisfaction), then it is desirable to direct quality improvement efforts towards those macro processes whose improvement will be reflected in the value of that quality measure. In this way the organizational quality measures can assist with determining the order in which to improve the identified macro processes.

Once quality improvement efforts are initiated within the macro processes, the organizational quality measures can assist managers to allocate the available resources among the various macro process improvement activities. Another use for the organizational quality measures is to allow managers to compare their own organization to competitors. Comparing the quality measures for one's own organization to those of another can provide an indication of how the two organizations compare in the marketplace. This may suggest that quality improvement efforts need to be increased, or it may indicate that no further improvements are necessary at the present time.

A quality measure related to cycle time is important by itself because it is usually the case that a reduction in the cycle time of a process results in an improvement in its quality (provided that the reduction in cycle time is achieved without compromising the values of other relevant measures). Thus, provided an organization is willing to invest the necessary resources, quality can be improved by reducing the cycle time for any macro process.

Additional performance measures can be identified by leading a customer (or user of the method) through a series of steps intended to isolate those measures which characterize how a customer perceives or evaluates an output of the organization. For example, given an expected organizational output to a customer, the description of the output from the customer's perspective is used to identify the measure(s) to use in order to best determine the customer's perception of the value added. The method consists of requiring the user to identify each output generated by a process and to name the output using an "adjective(s)+noun" format. Then, the user is required to enter the name of one or more measures for each adjective in the output name and to categorize the measure based on whether it is time related, defect related, performance related, or some other nature.

The user is required to view the organization as being the recipient (customer) of outputs from the real customer that trigger the activities in a given Macro process, and then asked to use this same method to identify suitable measures to use to monitor the performance of the inputs needed from customers by each Macro process. The user is required to view the linkages of internal processes as having the dependent process be a "customer" and then asked to use this same method to identify the measures to use to monitor the performance of the linkages between the various processes.

Figure 7:
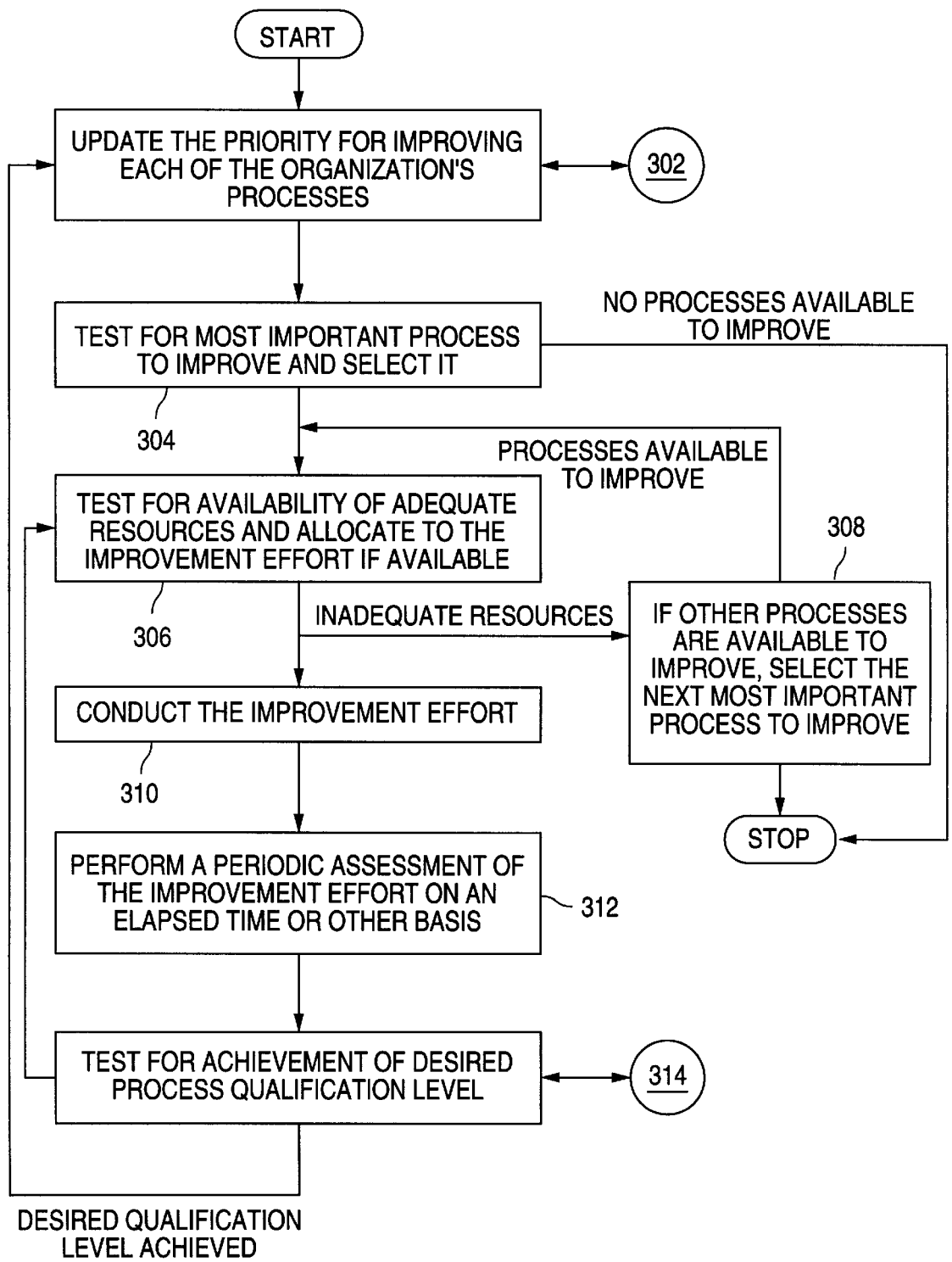
FIG. 7 is a flowchart showing the processing steps involved in selecting which macro process or subprocess to allocate resources to, and in monitoring the progress of the quality improvement effort directed to that process.

FIG. 7 is a flowchart showing the processing steps involved in selecting which macro process or subprocess to allocate resources to and in monitoring the progress of the quality improvement effort. The data processing operations depicted in FIG. 7 are intended to permit one skilled in the art to develop a computer program or logic structure for performing the processing operations of process improvement processor 112.

The first stage is to establish and/or update the priority for improving the organization's processes. This is shown as step 302 in the figure. During this step the relative importance of the organization's outputs to the customer are confirmed and the macro processes are ordered accordingly. The priority for improving the macro processes is then determined by taking into account the relative importance of the processes and any other criteria desired. The criteria may be based on performance measures of particular importance to a specific customer or the criteria may reflect current market conditions to which the organization wishes to respond. The set of operations which occurs during step 302 may be summarized as:

I. Confirm the relative importance designated for each organizational Output to Customers (i.e. the relative importance of the organization's macro processes). If changes in relative importance are desired
   A. Accept the changes
   B. Reorder the macro processes (Outputs and associated Inputs from Customers)
   C. Update the simulation display
II. Establish the priority for improving processes according to
   A. the relative importance of the macro processes,
   B. within a macro process, the order (node sequence) in which customers encounter or are impacted by elements ("front office", "back office", or "support") of the macro process
III. Select the most important macro process as the first process to be improved.
   A. Select the next most important macro process as the next one to improve
      1. Repeat the previous step until all macro processes have been addressed
IV. Evaluate the second most important macro process to improve
   A. It should be the Manage Customer Complaints or Warranty Claim macro process. If it is not, request confirmation that the order of the macro processes is intentionally in violation of the predefined default condition
V. If a macro process has been broken down into "front office", "back office", and "support" elements
   A. Select the first "front office" process customers encounter (the lowest node number) as the first process within the macro process to be improved
   B. To find the next element within the selected macro process to be improved, determine the destination of the key outputs of the first "front office" process selected in the previous step and each process that receives one of the outputs is a candidate for improvement, whether it is a "front office", "back office", or "support" process. If two or more processes are identified as a result of this step, prioritize "front office" processes over "back office" processes, and prioritize "back office" processes over "support" processes.
      1. If two or more processes are tied in priority, request an indication of relative importance from the user and order the priority accordingly.
   C. Repeat the previous step for each "front office" and "back office" element of the macro process
VI. Update the process database and display the results.

The result of step 302 is a listing of the prioritized order in which to allocate quality improvement resources to the identified macro processes and the constituent subprocesses. At step 304 a highest priority process is tested for, and if one exists, it is selected for improvement. If all processes have already been selected, the process improvement activities end. After selecting the process to improve, the availability of adequate resources is checked for at step 306. This determination can be made utilizing the information contained in resource database 106 of FIG. 1, and may involve considerations of the type and magnitude of resources available, and whether those resources are suitable for use in improving the process being considered.

If the resources available are not sufficient or appropriate for use in improving the selected process, then control is passed to step 308 where another process (the next most important one) is selected for improvement. This process is then examined to determine if sufficient resources are available for its improvement. This cycle continues until a suitable process is found. The resources are then allocated to improving the selected process at step 310. This may involve any one of many modifications to the manner in which the process is currently executed, including providing additional personnel, equipment, altering the order or manner in which the activities which are part of the process are executed, etc. If the improvement efforts are properly directed to processes having an impact on performance measures of concern to a customer then the result of the efforts will be an improvement in the customer perceived quality of the organization.

After process improvement efforts are conducted it is important to periodically assess the success of the efforts and determine if any further improvements should be made. This operation occurs at step 312. Finally, the process should be examined at some point to determine if the operation of the process has achieved a desired qualification level, as shown at step 314. A suitable process rating scheme to be used in this step is depicted in the Process Qualification Level Checklist shown in FIGS. 8-A and 8-B.

As discussed, Process Qualification is a formal method of evaluating and ranking a process's performance, and is essential to managing any process. The Process Qualification method determines which of six possible levels (Unknown, Defined, Functional, Proficient, Premier, or World-Class) the process is performing within. The qualification level of a process is computed according to the following:

Level five (Defined) is assumed to be the level being assessed;

If all items are found to be completed for the assumed level being assessed, assume the next lower numbered level and repeat this step;

If all items at all levels are found to be complete, the qualification level is set to 1.0. and the remaining related activities are skipped;

If a level is found whose items have not all been satisfied, the user is requested to change the status of any item within the assumed level that is shown as incomplete but which, in fact, is complete;

The user is required to enter a text description of the evidence that satisfies completion of each item to be shown as complete. If this results in all items being fully satisfied at the assumed level, the previous step is repeated to test for the possibility of the process needing to be assessed within the next lower level;

If the assumed level does not have all items completed, the Qualification Level for the process is computed according to the formula: $QL = L + (\Sigma I * W)/M$ where:

L=Level (assumed) found with not all items completed.
I=An individual item within the selected level.
W=Weight to be associated with an individual item.
M=Maximum number of items related to L.

Once the processes have been assigned initial ratings according to the scheme of FIGS. 8-A and 8-B (or another suitable scheme), the qualification level of an "improved process" or set of processes can be found from the above expression. This is the basis for the qualification check which occurs at step 314. The set of operations which occurs during step 314 may be summarized as:

1. Retrieve the relevant process information (e.g., output generated, the results of the last qualification, etc.) from the process database.
2. Obtain data about the status of the process being improved.
3. Determine if customized qualification level weighting is desired
   3.1. If yes accept information on the individualized criteria weightings
   3.2. If not, use default weighting
4. Compute the current qualification level of the process.
   4.1. Assume the least desirable qualification level
   4.2. Compare the items completed at that level with the maximum possible to complete for the selected level
   4.3. If all items are found to be completed for the assumed level, assume the next higher qualification level and repeat the previous step unless all levels have been evaluated
   4.4. If all levels have been evaluated, designate the qualification as the highest possible=1.0
   4.5. When the comparison identifies a level wherein not all the items are completed, compute the qualification level as a subnumber of that level.
5. Update the process database and display the results.

Before beginning a continuous improvement effort for a given process, it is important to develop a plan for how to go about improving a process. This plan must guide all future activities of the improvement team and, therefore, is endless by design. There are several such plans described in readily available publications. See for instance G. Robson in "Continuous Process Improvement: Simplifying Work Flow Systems", The Free Press, A Division of Macmillan, Inc., 1991, New York, N.Y., pg 28. Other plans are available in the public domain (e.g., Xerox Corporation).

Figure 9:
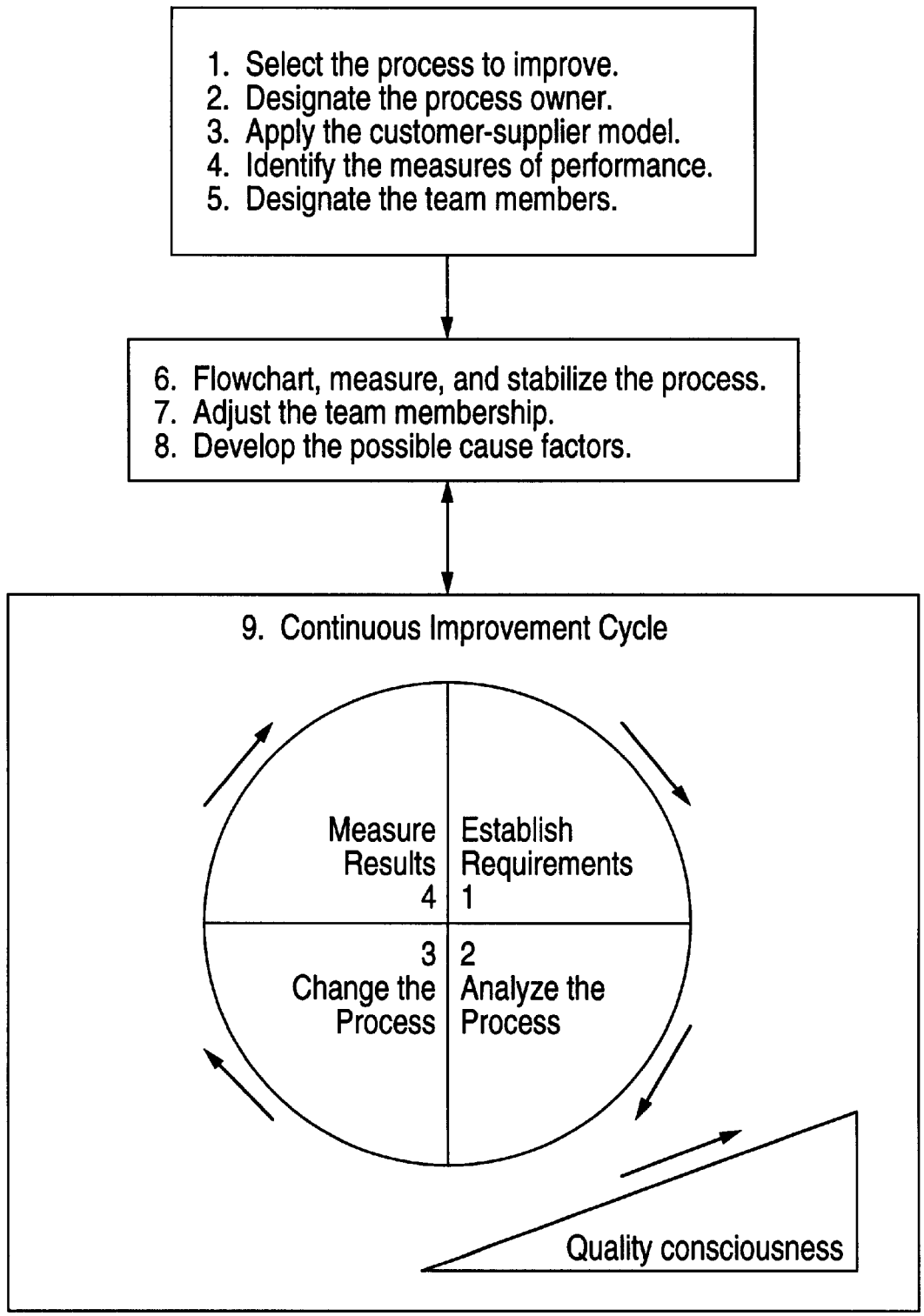
FIG. 9 depicts a possible "Process Improvement" process that can be used in conjunction with the present invention.
Figure 10A:
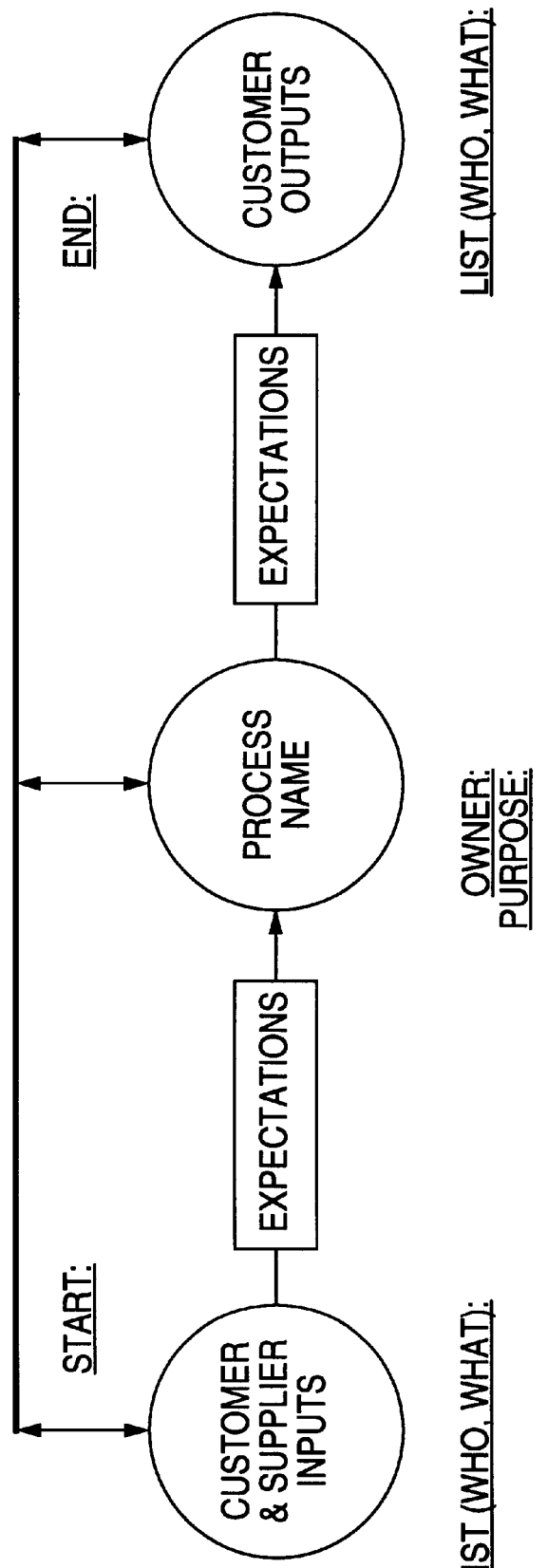
FIGS. 10-A through 10-D show a blank Process Profile® form used for further defining an organizational process, and completed Process Profiles for several processes found in different industries.
Figure 10B:
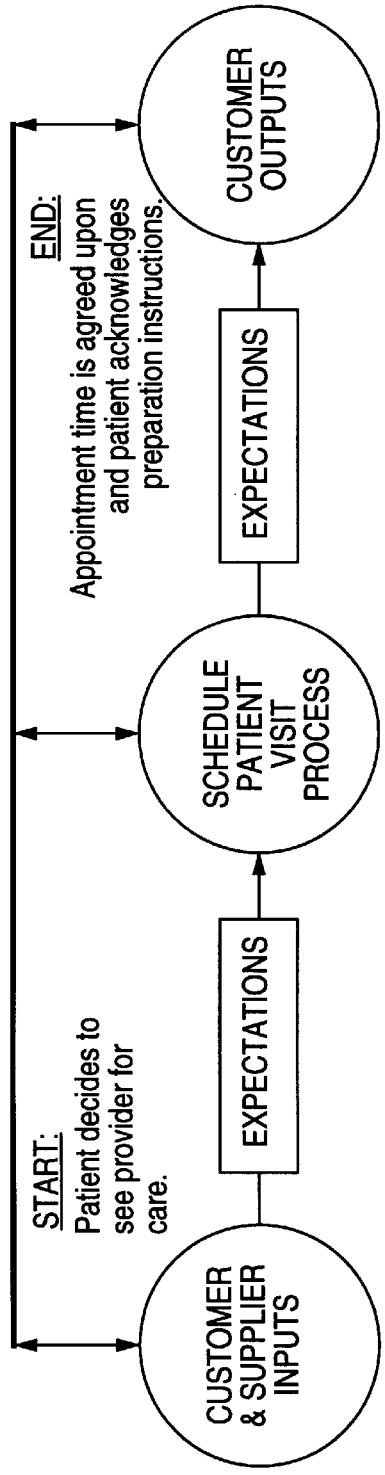
Figure 10C:
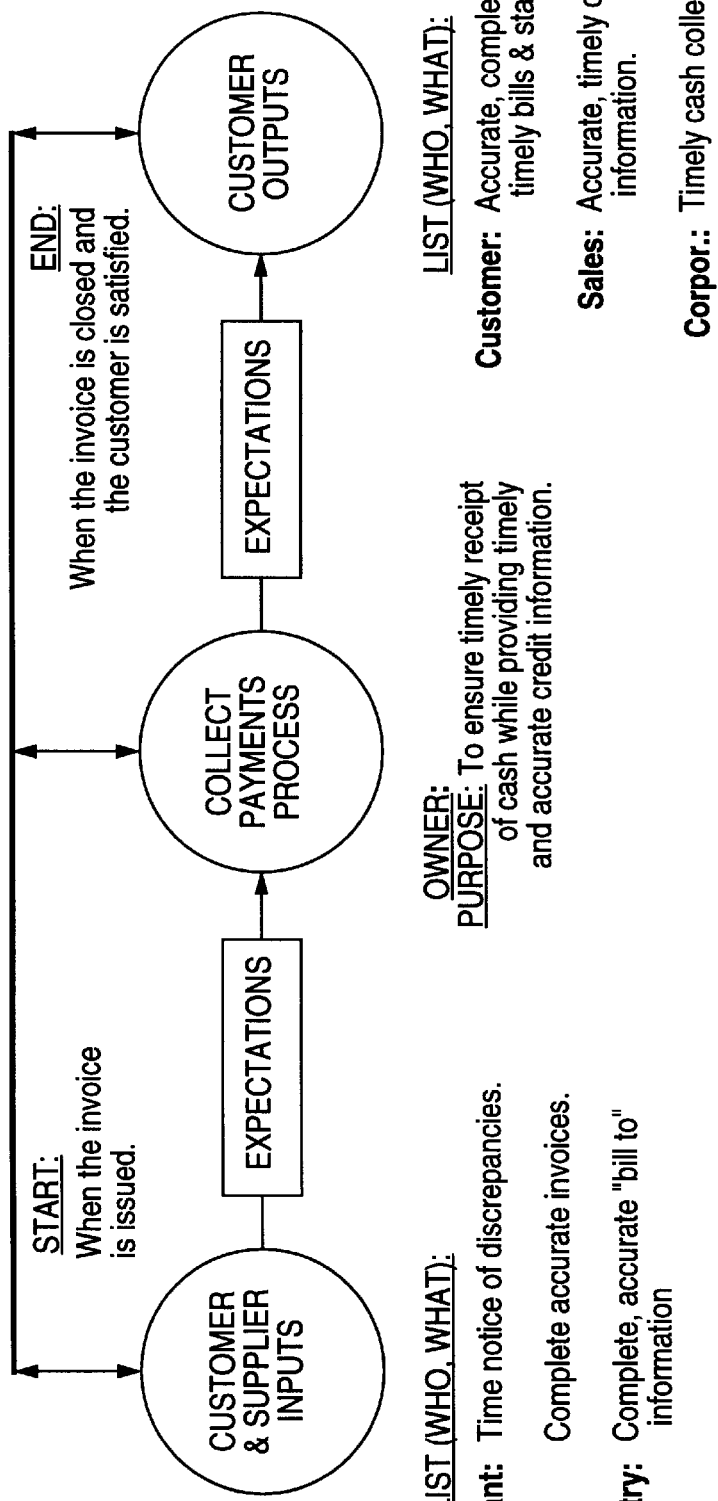
Figure 10D:
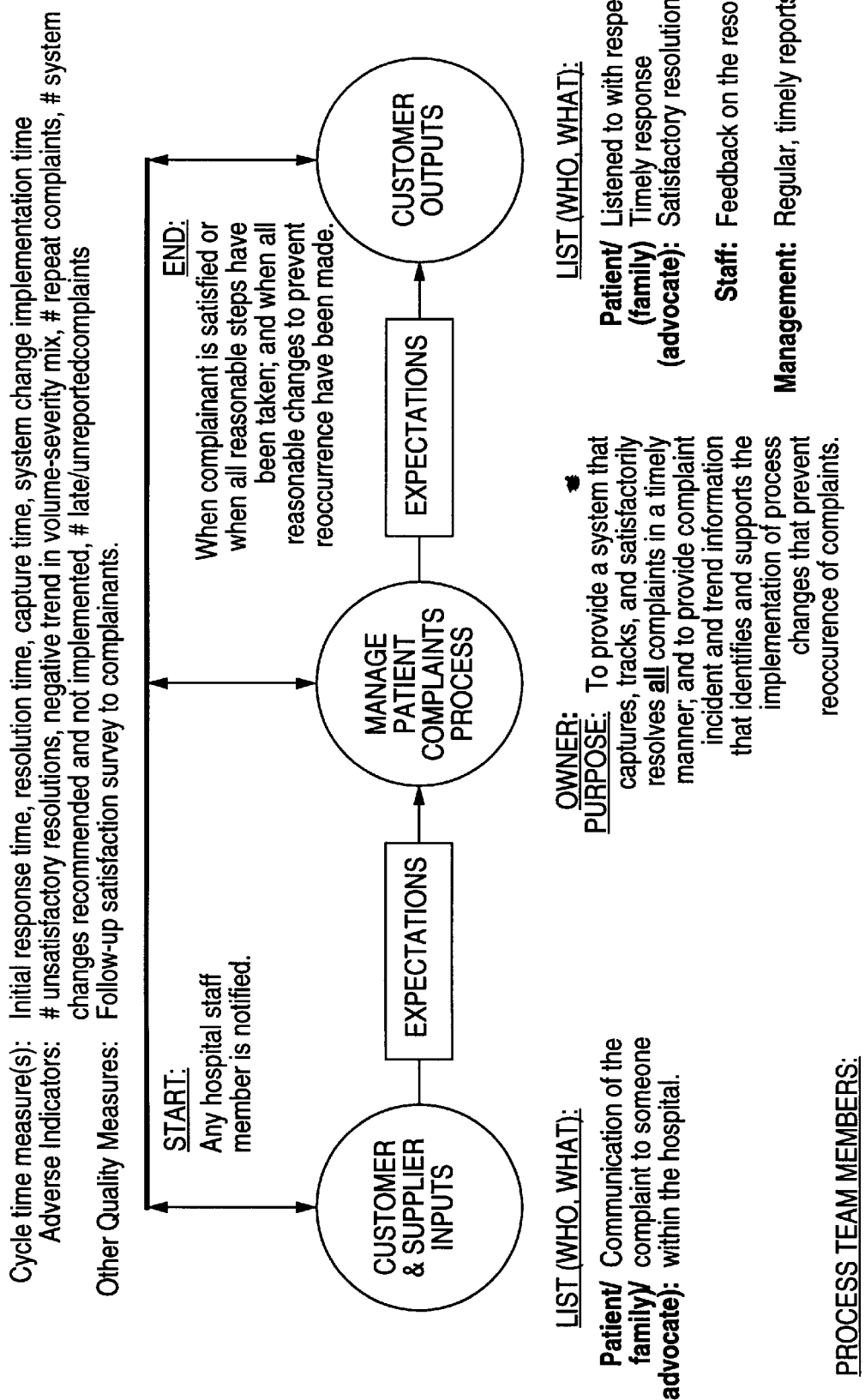

One thing that most of these plans neglect is a step that "estabilizes" the process before beginning improvement. That concept is effectively described by R. Moen and T. Nolan in "Process Improvement: A step-by-step approach to analyzing and improving a process", Quality Progress, September, 1987, pg 62–68. FIG. 9 depicts a "Process Improvement" process that is a synthesis of the most useful elements contained in the various plans discussed above. Notice that the actual improvement cycle is a continuous one.

If appropriate, the executive team members also should be familiar with the basic techniques of group process (e.g., brainstorming). Then the executive management can use the prioritized list of macro processes to initiate improvement of individual macro processes. Only two or three processes should be improved initially. After those are successfully launched, the improvement of the remaining macro processes can be phased in, one at a time, over a period of time. Preferably, a seasoned facilitator is used to run each individual process improvement meeting until sufficient in-house resources are available.

Specific steps to follow when improving a given process are found in "Tools and Methods for the Improvement of Quality", by Gitlow, Gitlow, Oppenheim, and Oppenheim, published by Richard D. Irwin, Inc. (1989).

By first addressing the process issues of the organization, management will have a sound plan for implementing organization-wide quality improvement. And, perhaps more important, they will have avoided the most common false start made by many organizations: an expensive, front-end loaded, shotgun approach that involved training all employees in Quality Improvement before the management team was ready to utilize the new skills.

As an example of practicing the methodology of the present invention, application of the method to the case of a hospital will described. The accompanying figures (FIGS. 11-A through 11-C) show the result of applying the present invention to the case of a hospital or similar organization. The steps involved in such an application can be summarized as follows:

Application of the Invention: A Hospital
1. During initial installation, the user establishes the defaults most applicable to the organization.
   1.1. The irrelevant Macro processes are discarded: i.e., Quotation of Price/Delivery/Terms and Warranty Claims.
   1.2. The default table of "support" processes is initialized: i.e., Information systems, human resources, purchasing of materials and supplies, planning, continuous improvement, and management of financial resources.
   1.3. The list of questions for customers is initialized: The universe of possible products and services is narrowed to offer choices relevant to a hospital; the universe of possible measures is narrowed to offer the most relevant ones for the previously identified products and services.
   1.4. The relative importance function to use when comparing and ordering Macro processes is customized: revenue generated from a Macro process is selected as the top consideration; the second priority to use in weighting process importance is designated to be number of outputs per unit of time.
2. Construct and/or update the process database
   2.1. For a user input driven use of the invention, distribute questionnaires containing the customer relevant information and collect completed ones. Enter the answers into the appropriate database.
      2.1.1. Merge the information about departments with existing departmental data.
      2.1.2. The information from customers is entered in a separate, new database used by this system.
   2.2. Determine the organizations Macro processes, order them according to importance, display the results for the user.
   2.3. Breakdown the most important Macro process into its "front office" and "back office" components. Identify the "support" processes and display the results for the user.
   2.4. "Zoom-in" on selected processes and update their definitions and display the results for the user.
   2.5. Produce reports as needed from any combination of all databases used.
3. Select and target processes to be improved and monitor their status.
   3.1. Select the most important Macro process.
   3.2. Select the "front office" process with the lowest node number.
      3.2.1. Evaluate its current performance level using the measures and standards identified via the questionnaires.
      3.2.2. If it is performing within tolerance on its most important customer measures, select the next "front office" process based on incrementing the node number and repeat the previous step. If all "front office" candidates are exhausted, proceed to the "back office" processes for this Macro process and select them based upon importance. If all "back office" candidates are exhausted, proceed to the next most important Macro process. If all Macro processes are exhausted, proceed to the "support" processes based upon user preference. If all possible process candidates are exhausted, propose the performance limits be tightened for one or more Macro processes.

3.2.3. Once a process is found not performing within tolerance go to the next step.

3.3. If resources are available, allocate them to the improvement of this process. If resources are inadequate for this process but possibly adequate for another process, repeat the previous step so as to select the next process as an improvement candidate.

3.3.1. Specify the measures to monitor and the means for collecting the data (e.g., sensor, automated systems, or terminal).

3.3.2. Monitor the data for trends and trends outside control limits.

3.4. Once the selected process is performing within control limits and/or six months have elapsed, evaluate the process qualification level.

3.4.1. Compare the qualification level with the target level.

3.4.1.1. If the target level is achieved, select another process to improve.

3.4.1.2. If the target level is unmet, evaluate the available resources for possible increase of those allocated to this process.

Figure 11A:
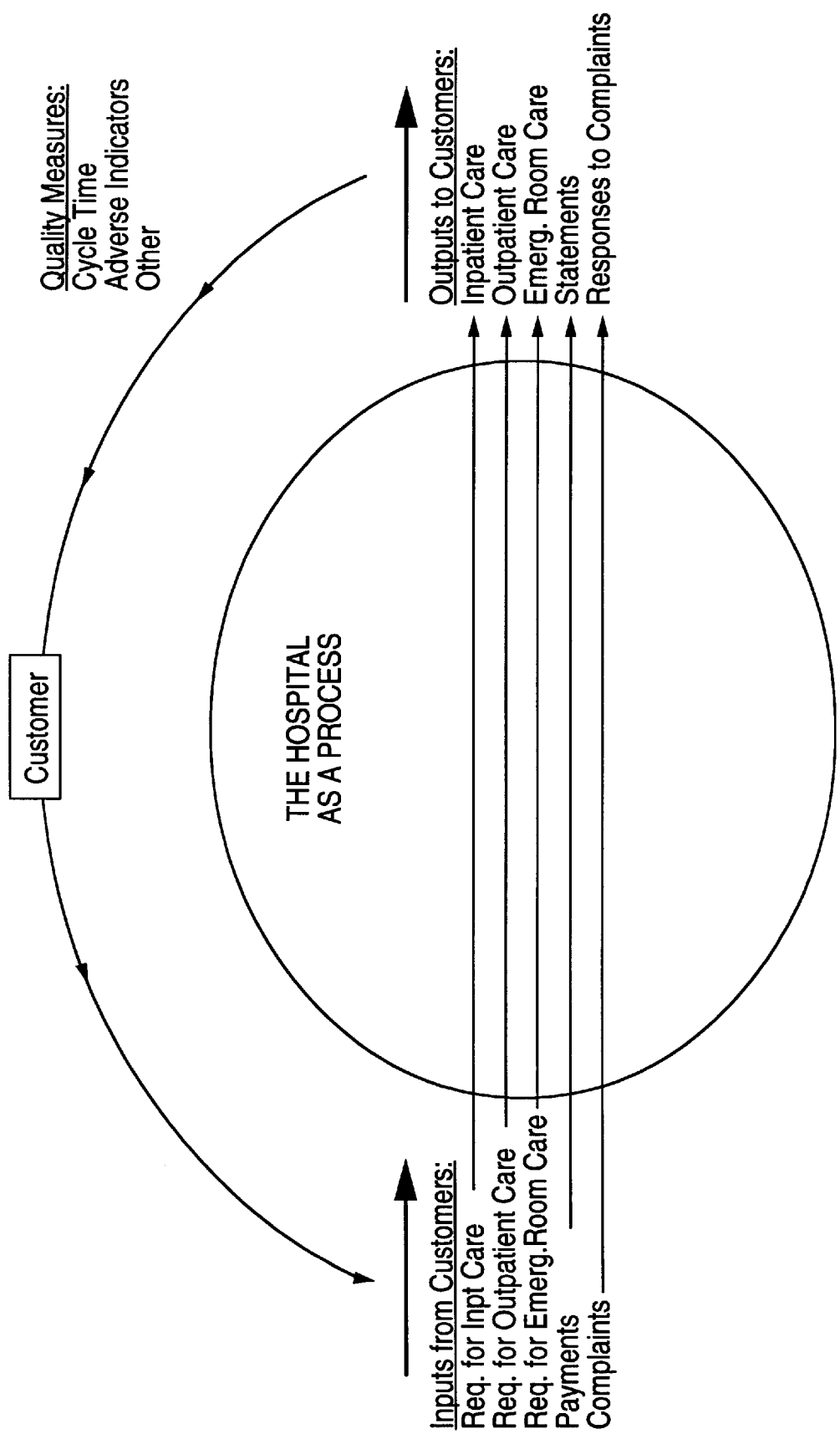
FIGS. 11-A through 11-C show the result of applying the present invention to the case of a hospital or similar organization.
Figure 11B:
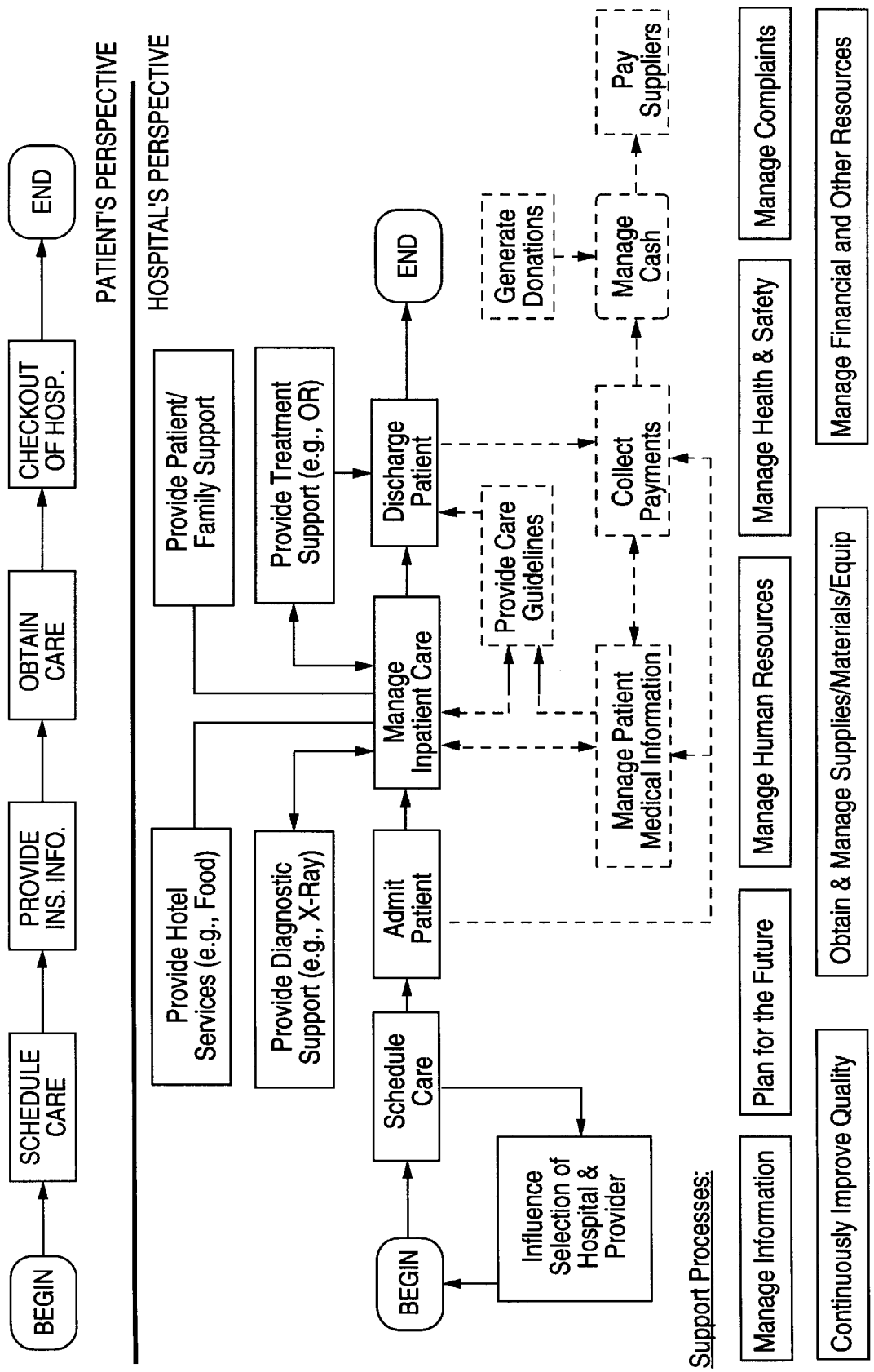
Figure 11C:
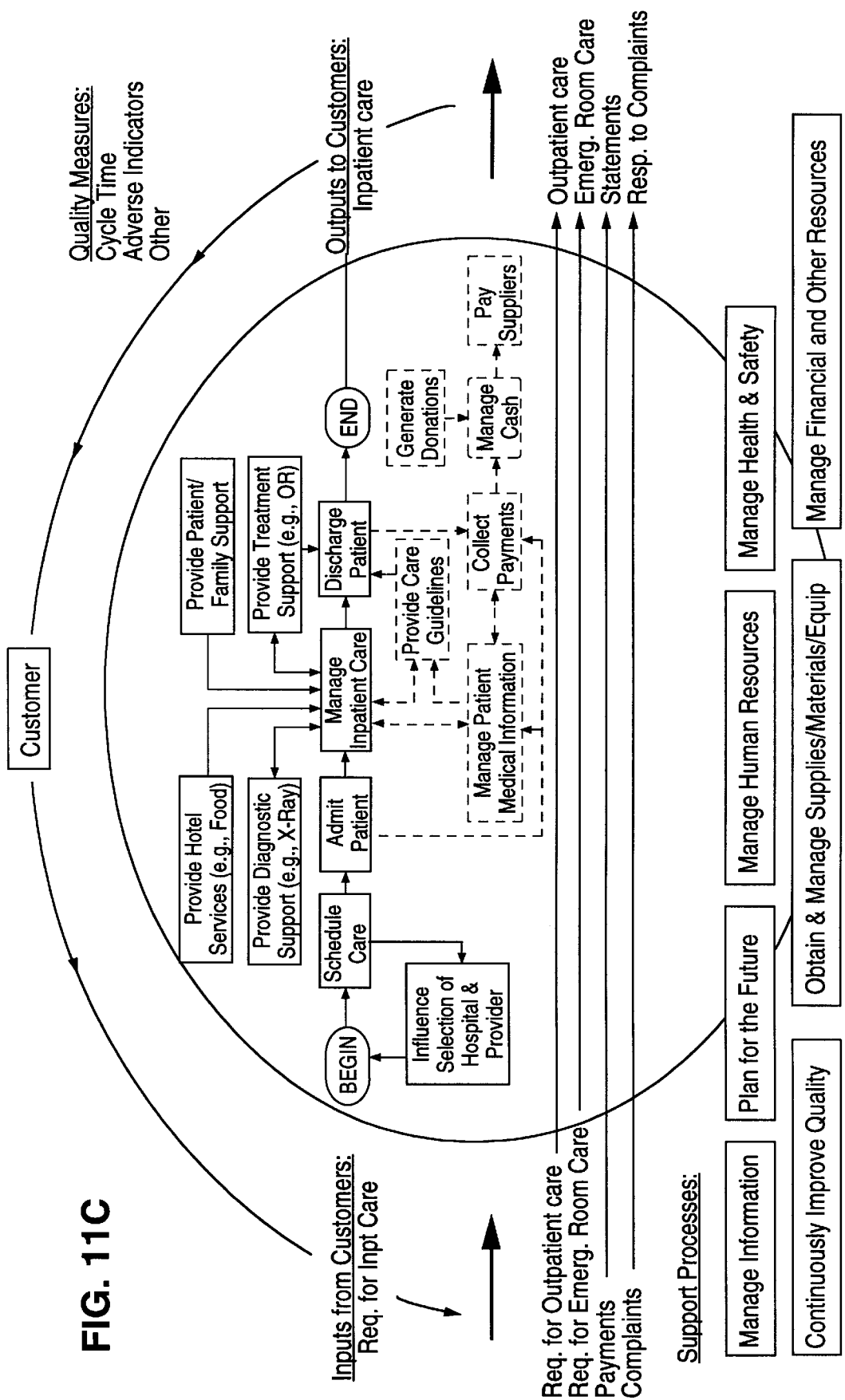

FIG. 11-A shows the basic model of a hospital as a process, with the hospital and customer(s) part of a feedback process. Also shown are the typical inputs from customers, outputs to customers, and representative quality measures used by the customers to evaluate the performance of the organization.

FIG. 11-B shows the macro processes of the hospital from a patient's perspective (top) and the macro and related processes from the hospital's perspective (bottom). The center line of processes in the hospital perspective portion (Begin—Schedule Care—Admit Patient—Manage Inpatient Care—Discharge Patient—End) represents those functional units of the hospital which correspond to the patient perspective activities shown. They can be identified by mapping the patient perspective processes to those contained in the organizational database, or by using one of the process tracing techniques discussed in this application. The remaining processes shown in the hospital perspective portion represent the front office, back office, and support processes of the hospital which are identified by the present invention.

FIG. 11-C shows an example of one of the graphical reports which can be generated by the present invention. The figure shows the result for the case of a hospital, and represents the relationship between the hospital and a customer, along with the organizational processes identified by practicing the invention. The report can be used to remind managers of the process flow of the organization and how the elements of that flow impact a customer's perception of the organization. It can also be used to assist them in identifying the information needed to implement the organizational model produced by the present invention.

The present invention provides a management tool for use by organizational decision makers, especially those who allocate organizational resources, in order to improve customer perceptions of the organization. Executives in customer driven organizations know that they must consider customer perceptions as a factor in every decision they make. The best customer driven organizations do this dependably and systematically. It is built into every activity the organization engages in. The foundation of the invention rests on the belief that the management of every organization can structure the organization's activities and related performance measures so as to systematically and continuously ensure customer perceptions are factored into organizational decision making. This is accomplished by constructing a process model of the organization or having the user interactively break the organization down into processes as perceived by the organization's customers. The invention then determines which activities in the organization will show the greatest customer related benefits if resources are available to invest in improving the organization.

The present invention can be operated in two basic modes: 1) the current condition mode which reflects operations of the organization as they currently exist, and 2) a speculative mode which reflects contemplated possible organizational changes and indicates the impact of those changes on customer perceptions of the organization.

The speculative mode is used after development of the basic organizational model to investigate how changes in the structure of the organization impact the customer perceived performance measures. For example, one or more functional units of the organization may be bypassed or deleted by modifying the organizational database. The impact of the new organizational structure on the cycle time can then be evaluated. This assists in identifying functional units within the organization which have the greatest impact on the cycle time and may suggest a way to improve the cycle time through restructuring of the organization. Another use of the speculative mode is to select a performance measure of interest and focus on the impact of resource allocation activities on that measure. This assists in identifying potential changes to the flow of inputs and outputs through the organization which have a significant impact on that measure.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. A method for allocating organizational resources to increase customers' positive impressions of an organization, thereby leading to increased market share and profits for the organization, the method comprising:

measuring data of an organization to determine an initial allocation of the resources;

determining a customer input to the organization, an output from the organization produced in response to the customer input, and a performance measure used by a customer to evaluate the output of the organization from a customer perspective;

determining the functional units of the organization, and the corresponding input(s) and output(s) of each functional unit;

constructing a process based organizational model of one or more primary macro processes as perceived by a customer to occur within the organization when the organization responds to the customer input by producing the output, wherein the organizational model is constructed independent of perceptions of the processes of the organization of persons other than customers;

developing the process based organizational model to include interrelationships between the primary macro processes, and relevant front office, back office, and support subprocesses of the organization, wherein the front office, back office, and support subprocesses includes functional units of the organization;

determining a primary macro process or a relevant front office, back office or support subprocesses of the organization having the greatest impact on the performance measure(s) which reflect how the customer(s) evaluate the output of the organization; and generating an output display that provides information for reallocating the organization's resources based on said determining, constructing and developing steps to improve the operation of the determined macro process or subprocess.

2. The resource allocation method of claim 1, further comprising:

determining the process qualification level of the determined macro process or subprocess;

allocating additional organizational resources to the determined macro process or subprocess if it doesn't meet a desired qualification level; and repeating the relevant steps of claim 1 to allocate resources to other macro processes or subprocesses if the determined macro process or subprocess meets the desired qualification level.

3. The resource allocation method of claim 1, wherein the customer input, organization output, and performance measure is determined by querying a customer and recording their responses.

4. The resource allocation method of claim 1, wherein the functional units of the organization, and the inputs and outputs of each unit are determined by querying a manager of the organization and recording the responses of the manager.

5. The resource allocation method of claim 1, wherein the customer input, organization output, and performance measure is determined from a database containing a set of generic data for a second organization in an industry similar to the organization.

6. The resource allocation method of claim 1, wherein the functional units of the organization, and the inputs and outputs of each unit is determined from a database containing a set of generic data for a second organization in an industry similar to the organization.

7. The resource allocation method of claim 1, wherein the process based organizational model is constructed by tracing the customer input to a first functional unit of the organization which utilizes that input, tracing the output of the first functional unit to a second functional unit which uses the output of the first functional unit as an input, and continuing the tracing until the customer output is produced by a functional unit of the organization.

8. The resource allocation method of claim 1, wherein the process based organizational model is constructed by tracing the organization output to a first functional unit of the organization which produces that output, tracing the input of the first functional unit to a second functional unit which produces the input of the first functional unit as an output, and continuing the tracing until the customer input is utilized as an input by a functional unit of the organization.

9. The method of claim 1 wherein the step developing the process based organizational model includes customer perceived interrelationships between the primary macro processes, and relevant front office, back office and support subprocesses of the organization.

10. In the method of claim 9 for each primary macro process or a relevant front office, back office or support subprocesses of the organization, defining the elements of the process/subprocesses from the point of view of the customer.

11. In the method of claim 9 determining the qualification level of a primary macro process or a relevant front office, back office or support subprocesses of the organization.

12. A data processing system for allocating organizational resources to improve the customer perceived quality of a subject organization, comprising:

a data storage device for storing a database organized into a set of records of customer specific data, organizational specific data, and organizational quality improvement resource data, the customer specific data including a customer input to the organization which initiates operations leading to the production of a desired output from the organization and one or more performance measures reflecting how customers evaluate the output of the organization, the organizational specific data including a listing of the functional units of the organization and the inputs and outputs of each unit, the organizational quality and or performance improvement data including personnel, equipment, and funds available for allocation to the functional units of the organization;

a first computer processor means coupled to the data storage means for tracing the flow of the customer input through the organization to produce the desired output, for identifying the macro processes, front office, back office, and support subprocesses of the organization involved in producing the output, and for correlating the functional units of the organization to the identified processes and subprocesses as perceived by the customer to occur within the organization; and a second computer processor means for prioritizing and selecting an organizational process or subprocess to improve, where improvement of the selected process or subprocess will increase the customer perceived performance measure of the organization.

13. The data processing system of claim 12, further comprising:

graphical display means for displaying a relationship between the customer input, organizational output, and organizational specific data in the database resulting from the tracing operation performed by the first processor means.

14. The data processing system of claim 12, further comprising:

third processor means for determining the qualification level of a selected process, subprocess, or functional unit of the organization, wherein the qualification level is used by the second processor means in selecting an organizational process or subprocess to improve.

15. The data processing system of claim 12, further comprising:

data acquisition means used to obtain data for evaluating a selected performance measure, with the evaluated measure being used by the second processor means to select the organizational processes or subprocess to improve.

16. The data processing system of claim 12, wherein the organizational specific data contained in the storage means includes a set of generic macro processes common to a second organization in the same industry as the organization.

17. The data processing system of claim 12, wherein the organizational specific data contained in the storage means includes a set of support processes common to a second organization in the same industry as the organization.

18. The data processing system of claim 12, wherein the first processor means executes a computer program for tracing a customer input to a first functional unit of the organization which utilizes that input, tracing the output of the first functional unit to a second functional unit which uses the output of the first functional unit as an input, and continuing the tracing until the customer output is produced by a functional unit of the organization.

19. The data processing system of claim 12, wherein the first processor means executes a computer program for tracing a customer output to a first functional unit of the organization which produces that output, tracing the input of the first functional unit to a second functional unit which produces the input of the first functional unit as an output, and continuing the tracing until the customer input is utilized as an input by a functional unit of the organization.

20. A computer implemented method for determining an allocation of resources within an organization, the organization including one or more functional units, the method comprising the steps of:

creating a first data structure in a computer that is representative of an initial allocation of resources within the organization;

creating a second data structure in the computer that is representative of customer perceptions of processes of operation of the functional units of the organization;

determining a metric indicative of a performance rating of the organization from a customer perspective;

developing the second data structure to include representations of actual interrelationships between all of the processes of operation of the functional units of the organization and to include representations of each process's impact upon the performance rating metric as perceived by customers;

identifying a process of operation having the greatest potential positive impact on the metric within the developed second data structure; and modifying the first data structure to reflect an allocation of resources to the identified process of operation that improves the performance rating metric;

whereby reallocating the resources within the organization as specified in the modified first data structure accounts for the customer perception of process of operation of the functional units of the organization.

21. The method of claim 20, wherein the step of modifying the first data structure comprises the steps of:

determining a process qualification level of the identified process;

modifying the first data structure to reflect an allocation of resources to the identified process if the identified process does not meet a desired process qualification level;

identifying a next process having the next greatest potential positive impact on the performance rating metric within the developed second data structure if the identified process meets the desired process qualification level; and repeating steps of determining, modifying, and identifying until an identified process meets its desired process qualification level causes.

22. The method of claim 20, wherein the step of creating a second data structure in the computer that is representative of customer perceptions of a process of operation of the functional units of the organization includes querying a customer and recording the customer responses.

23. The method of claim 20, wherein the step of defining a metric indicative of a performance rating of the organization from a customer perspective includes querying a customer and recording the customer responses.

24. The method of claim 20, wherein the step of developing the second data structure to include representations of actual interrelationships between all of the processes of the organization includes querying a member of the organization and recording the members responses.

25. The method of claim 20, wherein the step of creating a second data structure that is representative of customer perceptions of a process of operation of the functional units of the organization and the step of defining a performance rating metric include:

deriving data from a database containing a set of data representative of customer perceptions of a process of operation of functional units and a performance rating metric of a second organization in an industry similar to the organization.

26. The method of claim 20, wherein the step of developing the second data structure to include representations of actual interrelationships between all of the processes of the organization includes:

deriving data from a database containing a set of data representative of actual interrelationships between all of the processes of a second organization in an industry similar to the organization.

27. The method of claim 20, wherein the step of developing the second data structure includes the step of tracking the effect of customer interactions with the organization by tracing the effects of an initial customer action through the interrelationships and interactions of the processes of the organization until an outcome is reached.

28. The method of claim 20, wherein the step of developing the second data structure includes the step of tracking the cause of an outcome backwards through the organization by tracing the causes of the organization's reactions through the interrelationships and interactions of the processes of the organization until an initial customer action is reached.

29. The method of claim 22, wherein the step of developing the second data structure includes incorporating customer input.

30. The method of claim 20 further including:

defining at least one customer input to the organization and at least one customer output from the organization to the customer produced in response to the customer input; and reproducing said defined input and said defined output on opposite sides of a graphical representation of the organization.

31. In the method of claim 30, graphically representing said organization as round and graphically representing the customer on a curved line extending from said designated output to said designated input.

32. The method of claim 30, further including graphically representing in sequence the functional units of the organization which a customer perceives to occur within the organization when the organization responds to a designated customer input by producing the designated output.

33. In the method of claim 32, graphically representing besides said graphical representation of said customer perceived said functional units the primary macro processes represented by functional units of the organization.

34. In the method of claim 33, graphically representing said primary macro processes and the interrelated relevant front office, back office and support functional units within said graphical representation of the organization and between said reproduced input and said reproduced output.

35. In the method of claim 34, graphically representing with said graphical representation of said primary macro processes the relevant front office, back office and support subprocesses of the organization interrelated to said graphically represented primary macro processes, wherein the front office, back office and support subprocesses are graphically represented by functional units of the organization.

36. In the method of claim 35, graphically representing a primary macro process or a subprocess having the greatest impact on the performance measure reflecting how customers evaluate the output of the organization.

37. A computer implemented method for improving a process within an organization comprising the steps of:

creating a first data structure in a computer that is representative of a process of operation of the organization;

creating a second data structure in the computer that is representative of outputs from the process to the customer;

identifying in the second data structure the end of the process as the output to the customer as perceived by the customer;

defining metrics indicative of performance ratings of each of the outputs of the process to the customer from the perspective of the customer;

creating a third data structure in the computer that is representative of customer and supplier inputs to the process;

identifying in the third data structure the start of the process as the starting action perceived by the customer;

defining metrics indicative of performance ratings of each of the customer and supplier inputs to the process; and producing an output display illustrating the process from the start to the end of the process as perceived by the customer.

38. A data processing system for creating an improved process within an organization comprising:

a storage means for storing the purpose of the process, the outputs of the process to the customer, the end of the process as perceived by the customer, the performance measures of the outputs of the process to the customer as perceived by the customer, the inputs to the process from the customer and suppliers, the start of the process as perceived by the customer and the performance measures of the inputs to the process; and first processor means coupled to the storage means for tracing the flow of the process from the customer inputs, through the organization process, to the outputs to the customer as perceived by the customer.

39. An article of manufacture comprising a computer usable medium having a computer readable program code embodied in said medium for creating an improved process within an organization, the computer readable program code in said article of manufacture comprising:

computer readable instructions for enabling the computer to store and execute a plurality of objects wherein the objects include:

a first object representative of a purpose of the process, one or more second objects each representative of one or more outputs of the process to the customer, a third object representative of an end of the process as perceived by the customer, one or more fourth objects each representative of one or more performance measures of the outputs of the process to the customer as perceived by the customer, one or more fifth objects each representative of one or more inputs to the process from the customer and suppliers, a sixth object representative of a start of the process as perceived by the customer, and one or more seventh objects each representative of the performance measures of the inputs to the process; and computer readable instructions for enabling the computer to trace the flow of data representative of the process from the fifth objects through and among the first, third, fourth, sixth, and seventh objects and out to the second objects.

40. An article of manufacture comprising a computer accessible medium having a computer readable program code embodied in said medium for allocating resources within an organization, the computer readable program code in said article of manufacture comprising:

a first set of computer readable instructions for enabling the computer to create a first data structure in a memory that is representative of an initial allocation of resources within the organization;

a second set of computer readable instructions for enabling the computer to create a second data structure in the memory that is representative of customer perceptions of processes of operation of the functional units of the organization;

a third set of computer readable instructions for enabling the computer to define a metric indicative of a performance rating of the organization from a customer perspective;

a fourth set of computer readable instructions for enabling the computer to develop the second data structure to include representations of actual interrelationships between all of the processes of operation of the functional units of the organization and to include representations of each process's impact upon the performance rating metric as perceived by customers;

a fifth set of computer readable instructions for enabling the computer to identify a process of operation having the greatest potential positive impact on the metric within the developed second data structure;

a sixth set of computer readable instructions for enabling the computer to modify the first data structure to reflect an allocation of resources to the identified process of operation that improves the performance rating metric; and a seventh set of computer readable instructions for enabling the computer to generate a report for reallocating the resources within the organization as specified in the modified first data structure.

* * * * *